United States Patent [19]
Gilhousen et al.

[11] Patent Number: 5,943,361
[45] Date of Patent: *Aug. 24, 1999

[54] SYSTEM AND METHOD FOR GENERATING SIGNAL WAVEFORMS IN A CDMA CELLULAR TELEPHONE SYSTEM

[75] Inventors: Klein S. Gilhousen, Bozeman, Mont.; Irwin M. Jacobs, La Jolla; Roberto Padovani, San Diego, both of Calif.; Lindsay A. Weaver, Jr., Boulder, Colo.; Charles E. Wheatley, III, Del Mar; Andrew J. Viterbi, La Jolla, both of Calif.

[73] Assignee: Qualcomm Incorporated, San Diego, Calif.

[*] Notice: This patent is subject to a terminal disclaimer.

[21] Appl. No.: 08/441,895

[22] Filed: May 16, 1995

Related U.S. Application Data

[63] Continuation of application No. 07/825,147, Jan. 24, 1992, Pat. No. 5,416,797, which is a continuation of application No. 07/543,496, Jun. 25, 1990, Pat. No. 5,103,459.

[51] Int. Cl.[6] .............................. H04B 15/00; H04K 1/00; H04L 27/30
[52] U.S. Cl. ............................ 375/200; 370/320; 375/295
[58] Field of Search ................................... 375/200, 207, 375/295, 208, 209, 309; 380/28, 33, 34, 49; 455/517; 379/59, 60; 370/320, 335, 208, 209

[56] References Cited

U.S. PATENT DOCUMENTS

| | | | |
|---|---|---|---|
| 4,630,283 | 12/1986 | Schiff | 375/200 |
| 4,635,221 | 1/1987 | Kerr | 375/200 |
| 4,765,753 | 8/1988 | Schmidt | 379/60 |
| 4,841,545 | 6/1989 | Endo et al. | 375/200 |
| 4,872,200 | 10/1989 | Jansen | 380/34 |
| 4,922,506 | 5/1990 | McCallister et al. | 375/200 |
| 4,933,952 | 6/1990 | Albrieux et al. | 375/1 |
| 5,005,159 | 4/1991 | Bronder et al. | 370/76 |
| 5,103,459 | 4/1992 | Gilhousen et al. | 375/1 |
| 5,416,797 | 5/1995 | Gilhousen et al. | 375/705 |

OTHER PUBLICATIONS

"Transmission of Information by Orthogonal Functions", Henning F. Harmuth, Springer–Verlag, New York Inc, 1969, pp. 73–81.
"Spread Spectum and Time Division Multiple Access Satellite Communications", Nirode C. Mohanty, *IEEE Transaction on Communication*, vol. Com. 25, No. 8, Aug. 1977, pp. 810–815.
"Coherent Spread Spectrum Systems", Jack K. Holmes, John Wiley &Sons, pp. 369–371.
"Modern Dictionary of Electronics", Rudolf F. Graf, Howard W. Sams & Co., Inc. Sixth Edition, Second Printing, 1984, pp. 749 and 1108.
"Mobile Cellular Telecommunications Systems", William C.Y. Lee, McGraw–Hill Book Company, 1989, p. 249.

*Primary Examiner*—Chi H. Pham
*Assistant Examiner*—Bryan Webster
*Attorney, Agent, or Firm*—Russell B. Miller; Sean English

[57] ABSTRACT

A system and method for communicating information signals using spread spectrum communication techniques. PN sequences are constructed that provide orthogonality between the users so that mutual interference will be reduced, allowing higher capacity and better link performance. With orthogonal PN codes, the cross-correlation is zero over a predetermined time interval, resulting in no interference between the orthogonal codes, provided only that the code time frames are time aligned with each other. In an exemplary embodiment, signals are communicated between a cell-site and mobile units using direct sequence spread spectrum communication signals. In the cell-to-mobile link, pilot, sync, paging and voice channels are defined. Information communicated on the cell-to-mobile link channels are, in general, encoded, interleaved, bi-phase shift key (BPSK) modulated with orthogonal covering of each BPSK symbol along with quadrature phase shift key (QPSK) spreading of the covered symbols. In the mobile-to-cell link, access and voice channels are defined. Information communicated on the mobile-to-cell link channels are, in general, encoded, interleaved, orthogonal signaling along with QPSK spreading.

27 Claims, 13 Drawing Sheets

SYSTEM AND METHOD FOR GENERATING SIGNAL WAVEFORMS IN A CDMA CELLULAR TELEPHONE SYSTEM

This is a continuation of U.S. patent application Ser. No. 07/825,147, filed Jan. 24, 1992, now U.S. Pat. No. 5,416,797 issued May 16, 1995, which is a continuation of U.S. patent application Ser. No. 07/543,496, filed Jun. 25, 1990, now U.S. Pat. No. 5,103,459 issued Apr. 7, 1992, both of which are entitled "SYSTEM AND METHOD FOR GENERATING SIGNAL WAVEFORMS IN A CDMA CELLULAR TELEPHONE SYSTEM".

BACKGROUND OF THE INVENTION

I. Field of the Invention

The present invention relates to cellular telephone systems. More specifically, the present invention relates to a novel and improved system and method for communicating information, in a mobile cellular telephone system or satellite mobile telephone system, using spread spectrum communication signals.

II. Description of the Related Art

The use of code division multiple access (CDMA) modulation techniques is one of several techniques for facilitating communications in which a large number of system users are present. Other multiple access communication system techniques, such as time division multiple access (TDMA), frequency division multiple access (FDMA) and AM modulation schemes such as amplitude companded single sideband (ACSSB) are known in the art. However the spread spectrum modulation technique of CDMA has significant advantages over these modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference.

In the just mentioned patent, a multiple access technique is disclosed where a large number of mobile telephone system users each having a transceiver communicate through satellite repeaters or terrestrial base stations (also referred to as cell-sites stations, cell-sites or for short, cells) using code division multiple access (CDMA) spread spectrum communication signals. In using CDMA communications, the frequency spectrum can be reused multiple times thus permitting an increase in system user capacity. The use of CDMA results in a much higher spectral efficiency than can be achieved using other multiple access techniques.

The satellite channel typically experiences fading that is characterized as Rician. Accordingly the received signal consists of a direct component summed with a multiple reflected component having Rayleigh fading statistics. The power ratio between the direct and reflected component is typically on the order of 6–10 dB, depending upon the characteristics of the mobile unit antenna and the environment about the mobile unit.

Contrasting with the satellite channel, the terrestrial channel experiences signal fading that typically consists of the Rayleigh faded component without a direct component. Thus, the terrestrial channel presents a more severe fading environment than the satellite channel in which Rician fading is the dominant fading characteristic.

The Rayleigh fading characteristic in the terrestrial channel signal is caused by the signal being reflected from many different features of the physical environment. As a result, a signal arrives at a mobile unit receiver from many directions with different transmission delays. At the UHF frequency bands usually employed for mobile radio communications, including those of cellular mobile telephone systems, significant phase differences in signals traveling on different paths may occur. The possibility for destructive summation of the signals may result, with on occasion deep fades occurring.

Terrestrial channel fading is a very strong function of the physical position of the mobile unit. A small change in position of the mobile unit changes the physical delays of all signal propagation paths, which further results in a different phase for each path. Thus, the motion of the mobile unit through the environment can result in a quite rapid fading process. For example, in the 850 MHz cellular radio frequency band, this fading can typically be as fast as one fade per second per mile per hour of vehicle speed. Fading this severe can be extremely disruptive to signals in the terrestrial channel resulting in poor communication quality. Additional transmitter power can be used to overcome the problem of fading. However, such power increases effect both the user, in excessive power consumption, and the system by increased interference.

The CDMA modulation techniques disclosed in U.S. Pat. No. 4,901,307 offer many advantages over narrow band modulation techniques used in communication systems employing satellite or terrestrial repeaters. The terrestrial channel poses special problems to any communication system particularly with respect to multipath signals. The use of CDMA techniques permit the special problems of the terrestrial channel to be overcome by mitigating the adverse effect of multipath, e.g. fading, while also exploiting the advantages thereof.

In a CDMA cellular telephone system, the same frequency band can be used for communication in all cells. The CDMA waveform properties that provide processing gain are also used to discriminate between signals that occupy the same frequency band. Furthermore the high speed pseudonoise (PN) modulation allows many different propagation paths to be separated, provided the difference in path delays exceed the PN chip duration, i.e. 1/bandwidth. If a PN chip rate of approximately 1 MHz is employed in a CDMA system, the full spread spectrum processing gain, equal to the ratio of the spread bandwidth to system data rate, can be employed against paths that differ by more than one microsecond in path delay from the desired path. A one microsecond path delay differential corresponds to differential path distance of approximately 1,000 feet. The urban environment typically provides differential path delays in excess of one microsecond, and up to 10–20 microseconds are reported in some areas.

In narrow band modulation systems such as the analog FM modulation employed by conventional telephone systems, the existence of multiple paths results in severe multipath fading. With wide band CDMA modulation, however, the different paths may be discriminated against in the demodulation process. This discrimination greatly reduces the severity of multipath fading. Multipath fading is not totally eliminated in using CDMA discrimination techniques because there will occasionally exist paths with delayed differentials of less than the PN chip duration for the particular system. Signals having path delays on this order cannot be discriminated against in the demodulator, resulting in some degree of fading.

It is therefore desirable that some form of diversity be provided which would permit a system to reduce fading. Diversity is one approach for mitigating the deleterious effects of fading. Three major types of diversity exist: time diversity, frequency diversity and space diversity.

Time diversity can best be obtained by the use of repetition, time interleaving, and error detection and coding which is a form of repetition. The present invention employs each of these techniques as a form of time diversity.

CDMA by its inherent nature of being a wideband signal offers a form of frequency diversity by spreading the signal energy over a wide bandwidth. Therefore, frequency selective fading affects only a small part of the CDMA signal bandwidth.

Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501, entitled "SOFT HAND-OFF IN A CDMA CELLULAR TELEPHONE SYSTEM", and U.S. Pat. No. 5,109,390, entitled "DIVERSITY RECEIVER IN A CDMA CELLULAR TELEPHONE SYSTEM", both assigned to the assignee of the present invention.

The deleterious effects of fading can be further controlled to a certain extent in a CDMA system by controlling transmitter power. A system for cell-site and mobile unit power control is disclosed in U.S. Pat. No. 5,056,109, entitled "METHOD AND APPARATUS FOR CONTROLLING TRANSMISSION POWER IN A CDMA CELLULAR MOBILE TELEPHONE SYSTEM", also assigned to the assignee of the present invention.

The CDMA techniques as disclosed in U.S. Pat. No. 4,901,307 contemplated the use of coherent modulation and demodulation for both directions of the link in mobile-satellite communications. Accordingly, disclosed therein is the use of a pilot carrier signal as a coherent phase reference for the satellite-to-mobile link and the cell-to-mobile link. In the terrestrial cellular environment, however, the severity of multipath fading, with the resulting phase disruption of the channel, precludes usage of coherent demodulation technique for the mobile-to-cell link. The present invention provides a means for overcoming the adverse effects of multipath in the mobile-to-cell link by using noncoherent modulation and demodulation techniques.

The CDMA techniques as disclosed in U.S. Pat. No. 4,901,307 further contemplated the use of relatively long PN sequences with each user channel being assigned a different PN sequence. The cross-correlation between different PN sequences and the autocorrelation of a PN sequence for all time shifts other than zero both have a zero average value which allows the different user signals to be discriminated upon reception.

However, such PN signals are not orthogonal. Although the cross-correlations average to zero, for a short time interval such as an information bit time the cross-correlation follows a binomial distribution. As such, the signals interfere with each other much the same as if they were wide bandwidth Gaussian noise at the same power spectral density. Thus the other user signals, or mutual interference noise, ultimately limits the achievable capacity.

The existence of multipath can provide path diversity to a wideband PN CDMA system. If two or more paths are available with greater than one microsecond differential path delay, two or more PN receivers can be employed to separately receive these signals. Since these signals will typically exhibit independence in multipath fading, i.e., they usually do not fade together, the outputs of the two receivers can be diversity combined. Therefore a loss in performance only occurs when both receivers experience fades at the same time. Hence, one aspect of the present invention is the provision of two or more PN receivers in combination with a diversity combiner. In order to exploit the existence of multipath signals, to overcome fading, it is necessary to utilize a waveform that permits path diversity combining operations to be performed.

It is therefore an object of the present invention to provide for the generation of PN sequences which are orthogonal so as to reduce mutual interference, thereby permitting greater user capacity, and support path diversity thereby overcoming fading.

SUMMARY OF THE INVENTION

The implementation of spread spectrum communication techniques, particularly CDMA techniques, in the mobile cellular telephone environment therefore provides features which vastly enhance system reliability and capacity over other communication system techniques. CDMA techniques as previously mentioned further enable problems such as fading and interference to be readily overcome. Accordingly, CDMA techniques further promote greater frequency reuse, thus enabling a substantial increase in the number of system users.

The present invention is a novel and improved method and system for constructing PN sequences that provide orthogonality between the users so that mutual interference will be reduced, allowing higher capacity and better link performance. With orthogonal PN codes, the cross-correlation is zero over a predetermined time interval, resulting in no interference between the orthogonal codes, provided only that the code time frames are time aligned with each other.

In an exemplary embodiment, signals are communicated between a cell-site and mobile units using direct sequence spread spectrum communication signals. In the cell-to-mobile link, pilot, sync, paging and voice channels are defined. Information communicated on the cell-to-mobile link channels are, in general, encoded, interleaved, bi-phase shift key (BPSK) modulated with orthogonal covering of each BPSK symbol along with quadrature phase shift key (QPSK) spreading of the covered symbols.

In the mobile-to-cell link, access and voice channels are defined. Information communicated on the mobile-to-cell link channels are, in general, encoded, interleaved, orthogonal signaling along with QPSK spreading.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
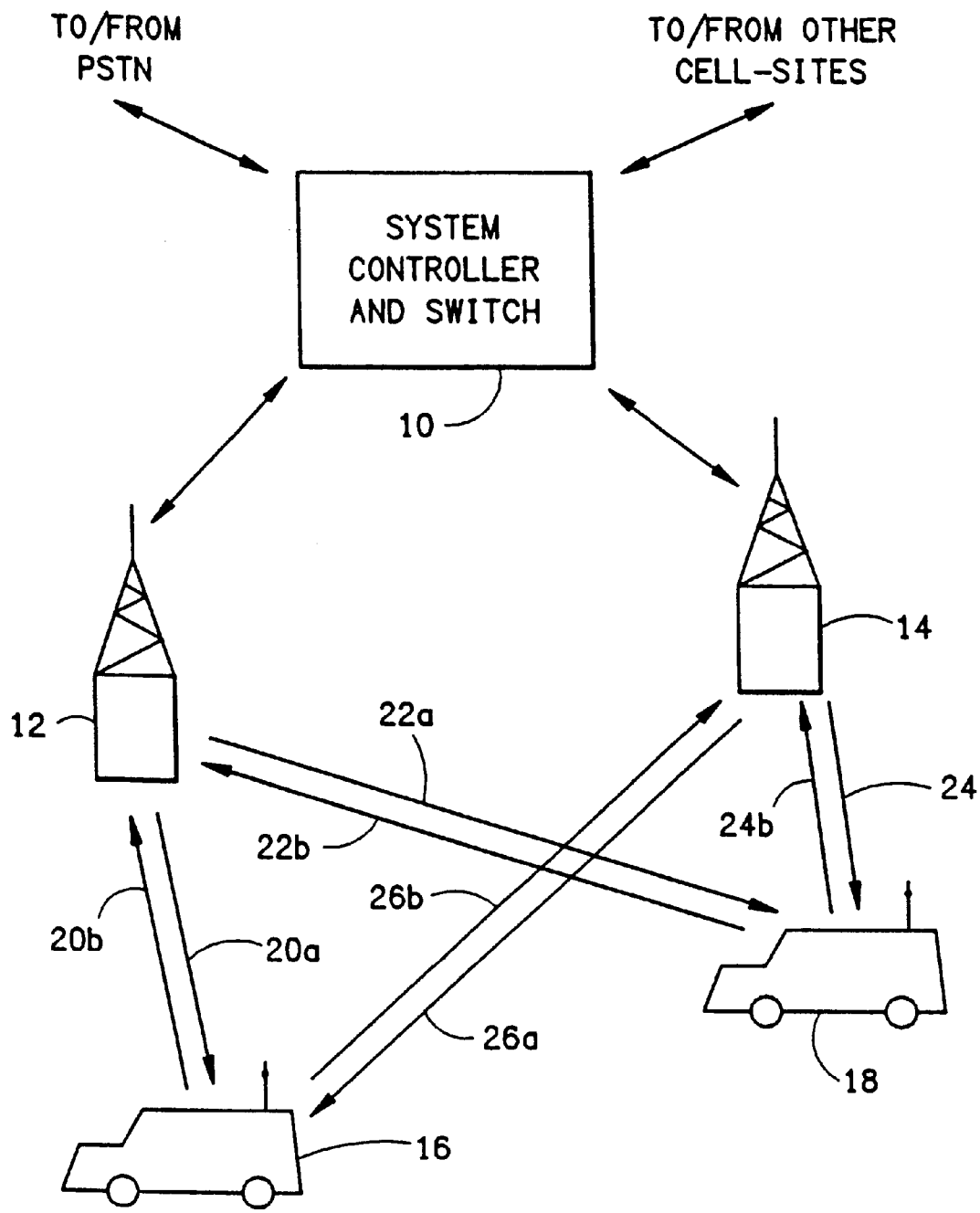
FIG. 1 is a schematic overview of an exemplary CDMA cellular telephone system.

In a CDMA cellular telephone system, each cell-site has a plurality of modulator-demodulator units or spread spectrum modems. Each modem consists of a digital spread spectrum transmit modulator, at least one digital spread spectrum data receiver and a searcher receiver. Each modem at the cell-site is assigned to a mobile unit as needed to facilitate communications with the assigned mobile unit.

A soft handoff scheme is employed for a CDMA cellular telephone system in which a new cell-site modem is assigned to a mobile unit while the old cell-site modem continues to service the call. When the mobile unit is located in the transition region between the two cell-sites, the call can be switched back and forth between cell-sites as signal strength dictates. Since the mobile unit is always communicating through at least one cell-site modem, fewer disrupting effects to the mobile unit or in service will occur. The mobile unit thus utilizes multiple receivers for assisting in the handoff process in addition to a diversity function for mitigating the effects of fading.

In the CDMA cellular telephone system, each cell-site transmits a "pilot carrier" signal. Should the cell be divided into sectors, each sector has an associated distinct pilot signal within the cell. This pilot signal is used by the mobile units to obtain initial system synchronization and to provide robust time, frequency and phase tracking of the cell-site transmitted signals. Each cell-site also transmits spread spectrum modulated information, such as cell-site identification, system timing, mobile paging information and various other control signals.

The pilot signal transmitted by each sector of each cell is of the same spreading code but with a different code phase offset. Phase offset allows the pilot signals to be distinguished from one another thus distinguishing originating cell-sites or sectors. Use of the same pilot signal code allows the mobile unit to find system timing synchronization by a single search through all pilot signal code phases. The strongest pilot signal, as determined by a correlation process for each code phase, is readily identifiable. The identified strongest pilot signal generally corresponds to the pilot signal transmitted by the nearest cell-site. However, the strongest pilot signal is used whether or not it is transmitted by the closest cell-site.

Upon acquisition of the strongest pilot signal, i.e. initial synchronization of the mobile unit with the strongest pilot signal, the mobile unit searches for another carrier intended to be received by all system users in the cell. This carrier, called the synchronization channel, transmits a broadcast message containing system information for use by the mobiles in the system. The system information identifies the cell-site and the system in addition to conveying information which allows the long PN codes, interleaver frames, vocoders and other system timing information used by the mobile unit to be synchronized without additional searching. Another channel, called the paging channel may also be provided to transmit messages to mobiles indicating that a call has arrived for them, and to respond with channel assignments when a mobile initiates a call.

The mobile unit continues to scan the received pilot carrier signal code at the code offsets corresponding to cell-site neighboring sector or neighboring transmitted pilot signals. This scanning is done in order to determine if a pilot signal emanating from a neighboring sector or cell is becoming stronger than the pilot signal first determined to be strongest. If, while in this call inactive mode, a neighbor sector or neighbor cell-site pilot signal becomes stronger than that of the initial cell-site sector or cell-site transmitted pilot signal, the mobile unit will acquire the stronger pilot signals and corresponding sync and paging channel of the new sector or cell-site.

When a call is initiated, a pseudonoise (PN) code address is determined for use during the course of this call. The code address may be either assigned by the cell-site or be determined by prearrangement based upon the identity of the mobile unit. After a call is initiated the mobile unit continues to scan the pilot signal transmitted by the cell-site through which communications are established in addition to pilot signal of neighboring sectors or cells. Pilot signal scanning continues in order to determine if one of the neighboring sector or cell transmitted pilot signals becomes stronger than the pilot signal transmitted by the cell-site the mobile unit is in communication with. When the pilot signal associated with a neighboring cell or cell sector becomes stronger than the pilot signal of the current cell or cell sector, it is an indication to the mobile unit that a new cell or cell sector has been entered and that a handoff should be initiated.

An exemplary telephone system in which the present invention is embodied is illustrated in FIG. 1. The system illustrated in FIG. 1 utilizes spread spectrum modulation techniques in communication between the system mobile units or mobile telephones, and the cell-sites. Cellular systems in large cities may have hundreds of cell-site stations serving hundreds of thousands of mobile telephones. The use of spread spectrum techniques, in particular CDMA, readily facilitates increases in user capacity in systems of this size as compared to conventional FM modulation cellular systems.

In FIG. 1, system controller and switch 10, also referred to as mobile telephone switching office (MTSO), typically includes interface and processing circuitry for providing system control to the cell-sites. Controller 10 also controls the routing of telephone calls from the public switched telephone network (PSTN) to the appropriate cell-site for transmission to the appropriate mobile unit. Controller 10 also controls the routing of calls from the mobile units, via at least one cell-site, to the PSTN. Controller 10 may connect calls between mobile users via the appropriate cell-sites since the mobile units do not typically communicate directly with one another.

Controller 10 may be coupled to the cell-sites by various means such as dedicated telephone lines, optical fiber links or microwave communication links. In FIG. 1, two such exemplary cell-sites 12 and 14 including, along with mobile units 16 and 18 each including a cellular telephone are illustrated. Cell-sites 12 and 14 as discussed herein and illustrated in the drawings are considered to service an entire cell. However it should be understood that the cell may be geographically divided into sectors with each sector treated as a different coverage area. Accordingly, handoffs are made between sectors of a same cell as is described herein for multiple cells, while diversity may also be achieved between sectors as is for cells.

In FIG. 1, arrowed lines 20a–20b and 22a–22b respectively define the possible communication links between cell-site 12 and mobile unit 16 and 18. Similarly, arrowed lines 24a–24b and 26a–26b respectively define the possible communication links between cell-site 14 and mobile units 16 and 18. Cell-sites 12 and 14 nominally transmit using equal power.

The cell-site service areas or cells are designed in geographic shapes such that the mobile unit will normally be closest to one cell-site, and within one cell sector should the cell be divided into sectors. When the mobile unit is idle, i.e. no calls in progress, the mobile unit constantly monitors the pilot signal transmissions from each nearby cell-site, and if applicable from a single cell-site in which the cell is sectorized. As illustrated in FIG. 1, the pilot signals are respectively transmitted to mobile unit 16 by cell-sites 12 and 14 upon outbound or forward communication links 20a and 26a. Mobile unit 16 can determine which cell it is in by comparing signal strength in pilot signals transmitted from cell-sites 12 and 14.

In the example illustrated in FIG. 1, mobile unit 16 may be considered closest to cell-site 12. When mobile unit 16 initiates a call, a control message is transmitted to the nearest cell-site, cell-site 12. Cell-site 12 upon receiving the call request message, transfers the called number to system controller 10. System controller 10 then connects the call through the PSTN to the intended recipient.

Should a call be initiated within the PSTN, controller 10 transmits the call information to all the cell-sites in the area. The cell-sites in return transmit a paging message within each respective coverage area that is intended for the called recipient mobile user. When the intended recipient mobile unit hears the page message, it responds with a control message that is transmitted to the nearest cell-site. This control message signals the system controller that this particular cell-site is in communication with the mobile unit. Controller 10 then routes the call through this cell-site to the mobile unit. Should mobile unit 16 move out of the coverage area of the initial cell-site, cell-site 12, an attempt is made to continue the call by routing the call through another cell-site.

With respect to cellular telephone systems, The Federal Communications Commission (FCC) has allocated a total of 25 MHz for mobile-to-cell links and 25 MHz for cell-to-mobile links. The FCC has divided the allocation equally between two service providers, one of which is the wireline telephone company for the service area and the other chosen by lottery. Because of the order in which allocations were made, the 12.5 MHz allocated to each carrier for each direction of the link is further subdivided into two sub-bands. For the wireline carriers, the sub-bands are each 10 MHz and 2.5 MHz wide. For the non-wireline carriers, the sub-bands are each 11 MHz and 1.5 MHz wide. Thus, a signal bandwidth of less than 1.5 MHz could be fit into any of the sub-bands, while a bandwidth of less than 2.5 MHz could be fit into all but one sub-band.

To preserve maximum flexibility in allocating the CDMA technique to the available cellular frequency spectrum, the waveform utilized in the cellular telephone system should be less than 1.5 MHz in bandwidth. A good second choice would be a bandwidth of about 2.5 MHz, allowing full flexibility to the wireline cellular carriers and nearly full flexibility to non-wireline cellular carriers. While using a wider bandwidth has the advantage of offering increased multipath discrimination, disadvantages exist in the form of higher equipment costs and lower flexibility in frequency assignment within the allocated bandwidth.

In a spread spectrum cellular telephone system, such as illustrated in FIG. 1, the preferred waveform design implemented involves a direct sequence pseudonoise spread spectrum carrier. The chip rate of the PN sequence is chosen to be 1.2288 MHz in the preferred embodiment. This particular chip rate is chosen so that the resulting bandwidth, about 1.25 MHz after filtering, is approximately one-tenth of the total bandwidth allocated to one cellular service carrier.

Another consideration in the choice of the exact chip rate is that it is desirable that the chip rate be exactly divisible by the baseband data rates to be used in the system. It is also desirable for the divisor to be a power of two. In the preferred embodiment, the baseband data rate is 9600 bits per second, leading to a choice of 1.2288 MHz, 128 times 9600 for the PN chip rate.

In the cell-to-mobile link, the binary sequences used for spreading the spectrum are constructed from two different types of sequences, each with different properties to provide different functions. There is an outer code that is shared by all signals in a cell or sector that is used to discriminate between multipath signals. The outer code is also used to discriminate between signals transmitted by different cells or sectors to the mobile units. There is also an inner code that is used to discriminate between user signals transmitted by single sector or cell.

The carrier waveform design in the preferred embodiment for the cell-site transmitted signals utilizes a sinusoidal carrier that is quadraphase (four phase) modulated by a pair of binary PN sequences that provide the outer code transmitted by a single sector or cell. The sequences are generated by two different PN generators of the same sequence length. One sequence bi-phase modulates the in-phase channel (I Channel) of the carrier and the other sequence bi-phase modulates the quadrature phase (Q Channel) of the carrier. The resulting signals are summed to form a composite four-phase carrier.

Although the values of a logical "zero" and a logical "one" are conventionally used to represent the binary sequences, the signal voltages used in the modulation process are +V volts for a logical "one" and –V volts for a logical "zero". To bi-phase modulate a sinusoidal signal, a zero volt average value sinusoid is multiplied by the +V or –V voltage level as controlled by the binary sequences using a multiplier circuit. The resulting signal may then be band limited by passing through a bandpass filter. It is also known in the art to lowpass filter the binary sequence stream prior to multiplying by the sinusoidal signal, thereby interchanging the order of the operations. A quadraphase modulator consists of two bi-phase modulators each driven by a different sequence and with the sinusoidal signals used in the bi-phase modulators having a 90° phase shift therebetween.

In the preferred embodiment, the sequence length for the transmitted signal carrier is chosen to be 32768 chips. Sequences of this length can be generated by a modified maximal-length linear sequence generator by adding a zero bit to a length 32767 chip sequence. The resulting sequence has good cross-correlation and autocorrelation properties. Good cross-correlation and autocorrelation properties are necessary to prevent mutual interference between pilot carriers transmitted by different cells.

A sequence this short in length is desirable in order to minimize acquisition time of the mobile units when they first enter the system without knowledge of system timing. With unknown timing, the entire length of the sequence must be searched to determine the correct timing. The longer the sequence, the longer time the acquisition search will require. Although sequences shorter than 32768 could be used, it must be understood that as sequence length is reduced, the code processing gain is reduces. As processing gain is reduced, the rejection of multipath interference along with interference from adjacent cells and other sources will also be reduced, perhaps to unacceptable levels. Thus, there is a desire to use the longest sequence that can be acquired in a reasonable time. It is also desirable to use the same code polynomials in all cells so that the mobile unit, not knowing what cell it is in when initially acquiring synchronization, can obtain full synchronization by searching a single code polynomial.

In order to simplify the synchronization process, all the cells in the system are synchronized to each other. In the exemplary embodiment, cell synchronization is accomplished by synchronizing all the cells to a common time reference, the Navstar Global Positioning System satellite navigation system which is itself synchronized to Universal Coordinated Time (UTC).

Signals from different cells are differentiated by providing time offsets of the basic sequences. Each cell is assigned a different time offset of the basic sequences differing from its neighbors. In the preferred embodiment, the 32768 repetition period is divided into a set of 512 timing offsets. The 512 offsets are spaced 64 chips apart. Each sector of each cell in a cellular system is also assigned a different one of the offsets to use for all its transmissions. If there are more than 512 sectors or cells in the system, then the offsets can be reused in the same manner as frequencies are reused in the present analog FM cellular system. In other designs, a different number than 512 offsets could be used. With reasonable care in assignment of pilot signal offsets, it should never be necessary for near neighboring cells to use near neighboring time offsets.

All signals transmitted by a cell or one of the sectors of the cell share the same outer PN codes for the I and Q channels. The signals are also spread with an inner orthogonal code generated by using Walsh functions. A signal addressed to a particular user is multiplied by the outer PN sequences and by a particular Walsh sequence, or sequence of Walsh sequences, assigned by the system controller for the duration of the user's telephone call. The same inner code is applied to both the I and Q channels resulting in a modulation which is effectively bi-phase for the inner code.

It is well known in the art that a set of n orthogonal binary sequences, each of length n, for n any power of 2 can be constructed, see *Digital Communications with Space Applications*, S. W. Golomb et al., Prentice-Hall, Inc., 1964, pp. 45–64. In fact, orthogonal binary sequence sets are also known for most lengths which are multiples of four and less than two hundred. One class of such sequences that is easy to generate is called the Walsh function, also known as Hadamard matrices.

A Walsh function of order n can be defined recursively as follows:

$$W(n) = \begin{vmatrix} W(n/2), & W(n/2) \\ W(n/2), & W'(n/2) \end{vmatrix}$$

where W' denotes the logical complement of W, and W(1)= |0|. Thus, $$W(2) = \begin{vmatrix} 0, 0 \\ 0, 1 \end{vmatrix} \text{ and}$$

$$W(4) = \begin{vmatrix} 0, 0, 0, 0 \\ 0, 1, 0, 1 \\ 0, 0, 1, 1 \\ 0, 1, 1, 0 \end{vmatrix}$$

W(8) is as follows:

$$W(8) = \begin{vmatrix} 0, 0, 0, 0, 0, 0, 0, 0 \\ 0, 1, 0, 1, 0, 1, 0, 1 \\ 0, 0, 1, 1, 0, 0, 1, 1 \\ 0, 1, 1, 0, 0, 1, 1, 0 \\ 0, 0, 0, 0, 1, 1, 1, 1 \\ 0, 1, 0, 1, 1, 0, 1, 0 \\ 0, 0, 1, 1, 1, 1, 0, 0 \\ 0, 1, 1, 0, 1, 0, 0, 1 \end{vmatrix}$$

A Walsh sequence is one of the rows of a Walsh function matrix. A Walsh function of order n contains n sequences, each of length n bits.

A Walsh function of order n (as well as other orthogonal functions) has the property that over the interval of n code symbols, the cross-correlation between all the different sequences within the set is zero, provided that the sequences are time aligned with each other. This can be seen by noting that every sequence differs from every other sequence in exactly half of its bits. It should also be noted that there is always one sequence containing all zeroes and that all the other sequences contain half ones and half zeroes.

Neighboring cells and sectors can reuse the Walsh sequences because the outer PN codes used in neighboring cells and sectors are distinct. Because of the differing propagation times for signals between a particular mobile's location and two or more different cells, it is not possible to satisfy the condition of time alignment required for Walsh function orthogonality for both cells at one time. Thus, reliance must be placed on the outer PN code to provide discrimination between signals arriving at the mobile unit from different cells. However, all the signals transmitted by a cell are orthogonal to each other and thus do not contribute interference to each other. This eliminates the majority of the interference in most locations, allowing a higher capacity to be obtained.

The system further envisions the voice channel to be a variable rate channel whose data rate can be varied from data block to data block with a minimum of overhead required to control the data rate in use. The use of variable data rates reduces mutual interference by eliminating unnecessary transmissions when there is no useful speech to be transmitted. Algorithms are utilized within the vocoders for generating a varying number of bits in each vocoder block in accordance with variations in speech activity. During active speech, the vocoder may produce 20 msec. data blocks containing 20, 40, 80, or 160 bits, depending on the activity of the speaker. It is desired to transmit the data blocks in a fixed amount of time by varying the rate of transmission. It is further desirable not to require signaling bits to inform the receiver how many bits are being transmitted.

The blocks are further encoded by the use of a cyclic redundancy check code (CRCC) which appends to the block an additional set of parity bits which can be used to determine whether or not the block of data has been decoded correctly. CRCC check codes are produced by dividing the data block by a predetermined binary polynomial. The CRCC consists of all or a portion of the remainder bits of the division process. The CRCC is checked in the receiver by reproducing the same remainder and checking to see of the received remainder bits are the same as the regenerated check bits.

In the disclosed invention, the receiving decoder decodes the block as if it contains 160 bits, and then again as if it contains 80 bits, etc. until all possible block lengths have been tried. The CRCC is computed for each trial decoding. If one of the trial decodings results in a correct CRCC, the data block is accepted and passed on to the vocoder for further processing. If no trial decoding produces a valid CRCC, the received symbols are passed on to the system's signal processor where other processing operations can optionally be performed.

In the cell transmitter, the power of the transmitted waveform is varied as the data rate of the block is varied. The highest data rate uses the highest carrier power. When the data rate is lower than the maximum, the modulator, in addition to lowering the power, repeats each encoded data symbol a number of times as required to achieve the desired transmission rate. For example, at the lowest transmission rate, each encoded symbol is repeated four times.

In the mobile transmitter, the peak power is held constant but the transmitter is gated off ½, or ¼ or ⅛ of the time in accordance with the number of bits to be transmitted in the data block. The positions of the ontimes of the transmitter is varied pseudo-randomly in accordance with the mobile user's addressed user code.

Cell-to-Mobile Link

In the preferred embodiment, the Walsh function size n, is set equal to sixty-four (n=64) for the cell-to-mobile link. Therefore each of up to sixty-four different signals to be transmitted are assigned a unique orthogonal sequence. The forward error correction (FEC) encoded symbol stream for each voice conversation is multiplied by its assigned Walsh sequence. The Walsh coded/FEC encoded symbol stream for each voice channel is then multiplied by the outer PN coded waveform. The. resultant spread symbol streams are then added together to form a composite waveform.

The resulting composite waveform is then modulated onto a sinusoidal carrier, bandpass filtered, translated to the desired operating frequency, amplified and radiated by the antenna system. Alternate embodiments of the present invention may interchange the order of some of the just described operations for forming the cell-site transmitted signal. For example, it may be preferred to multiply each voice channel by the outer PN coded waveform and perform the filtering operation prior to summation of all the channel signals to be radiated by the antenna. It is well known in the art that the order of linear operations may be interchanged to obtained various implementation advantages and different designs.

The waveform design of the preferred embodiment for cellular service uses the pilot carrier approach for the cell-to-mobile link as described in U.S. Pat. No. 4,901,307. All cells transmit pilot carriers using the same 32768 length sequence, but with different timing offsets to prevent mutual interference.

The pilot waveform uses the all-zero Walsh sequence, i.e. a Walsh sequence comprised of all zeroes that is found in all Walsh function sets. The use of the all-zero Walsh sequence for all cells' pilot carriers allows the initial search for the pilot waveform to ignore the Walsh functions until after the outer code PN synchronization has been obtained. The Walsh framing is locked to the PN code cycle by virtue of the length of the Walsh frame being a factor of the PN sequence length. Therefore, provided that the cell addressing offsets of the PN code are multiples of sixty-four chips (or the Walsh frame length) then the Walsh framing is known implicitly from the outer PN code timing cycle.

All the cells in a service area are supplied with accurate synchronization. In the preferred embodiment, a GPS receiver at each cell synchronizes the local waveform timing to Universal Coordinated Time (UTC). The GPS system allows time synchronization to better than 1 microsecond accuracy. Accurate synchronization of cells is desirable in order to allow easy handoff of calls between cells when mobiles move from one cell to another with a call in progress. If the neighboring cells are synchronized, the mobile unit will not have difficulty synchronizing to the new cell thereby facilitating a smooth handoff.

The pilot carrier is transmitted at a higher power level than a typical voice carrier so as to provide greater signal to noise and interference margin for this signal. The higher power level pilot carrier enables the initial acquisition search to be done at high speed and to make possible a very accurate tracking of the carrier phase of the pilot carrier by a relatively wide bandwidth phase tracking circuit. The carrier phase obtained from tracking the pilot carrier is used as the carrier phase reference for demodulation of the carriers modulated by user information signals. This technique allows many user carriers to share the common pilot signal for carrier phase reference. For example, in a system transmitting a total of fifteen simultaneous voice carriers, the pilot carrier might be allocated a transmit power equal to four voice carriers.

In addition to the pilot carrier, another carrier intended to be received by all system users in the cell is transmitted by the cell-site. This carrier, called the synchronization channel, also uses the same 32768 length PN sequence for spectrum spreading but with a different, pre-assigned Walsh sequence. The synchronization channel transmits a broadcast message containing system information for use by the mobiles in the system. The system information identifies the cell-site and the system and conveys information allowing the long PN codes used for mobile information signals to be synchronized without additional searching.

Another channel, called the paging channel may be provided to transmit messages to mobiles indicating that a call has arrived for them, and to respond with channel assignments when a mobile initiates a call.

Each voice carrier transmits a digital representation of the speech for a telephone call. The analog speech waveform is digitized using standard digital telephone techniques and then compressed using a vocoding process to a data rate of approximately 9600 bits per second. This data signal is then rate r=½, constraint length K=9 convolutional encoded, with repetition, and interleaved in order to provide error detection and correction functions which allow the system to operate at a much lower signal-to-noise and interference ratio. Techniques for convolutional encoding, repetition and interleaving are well known in the art.

The resulting encoded symbols are multiplied by an assigned Walsh sequence and then multiplied by the outer PN code. This process results in a PN sequence rate of 1.2288 MHz or 128 times the 9600 bps data rate. The resulting signal is then modulated onto an RF carrier and summed with the pilot and setup carriers, along with the other voice carriers. Summation may be accomplished at several different points in the processing such as at the IF frequency, or at the baseband frequency either before or after multiplication by the PN sequence.

Each voice carrier is also multiplied by a value that sets its transmitted power relative to the power of the other voice carriers. This power control feature allows power to be allocated to those links that require higher power due to the intended recipient being in a relatively unfavoring location. Means are provided for the mobiles to report their received signal-to-noise ratio to allow the power to be set at a level so as to provide adequate performance without waste. The orthogonality property of the Walsh functions is not disturbed by using different power levels for the different voice carriers provided that time alignment is maintained.

Figure 2:
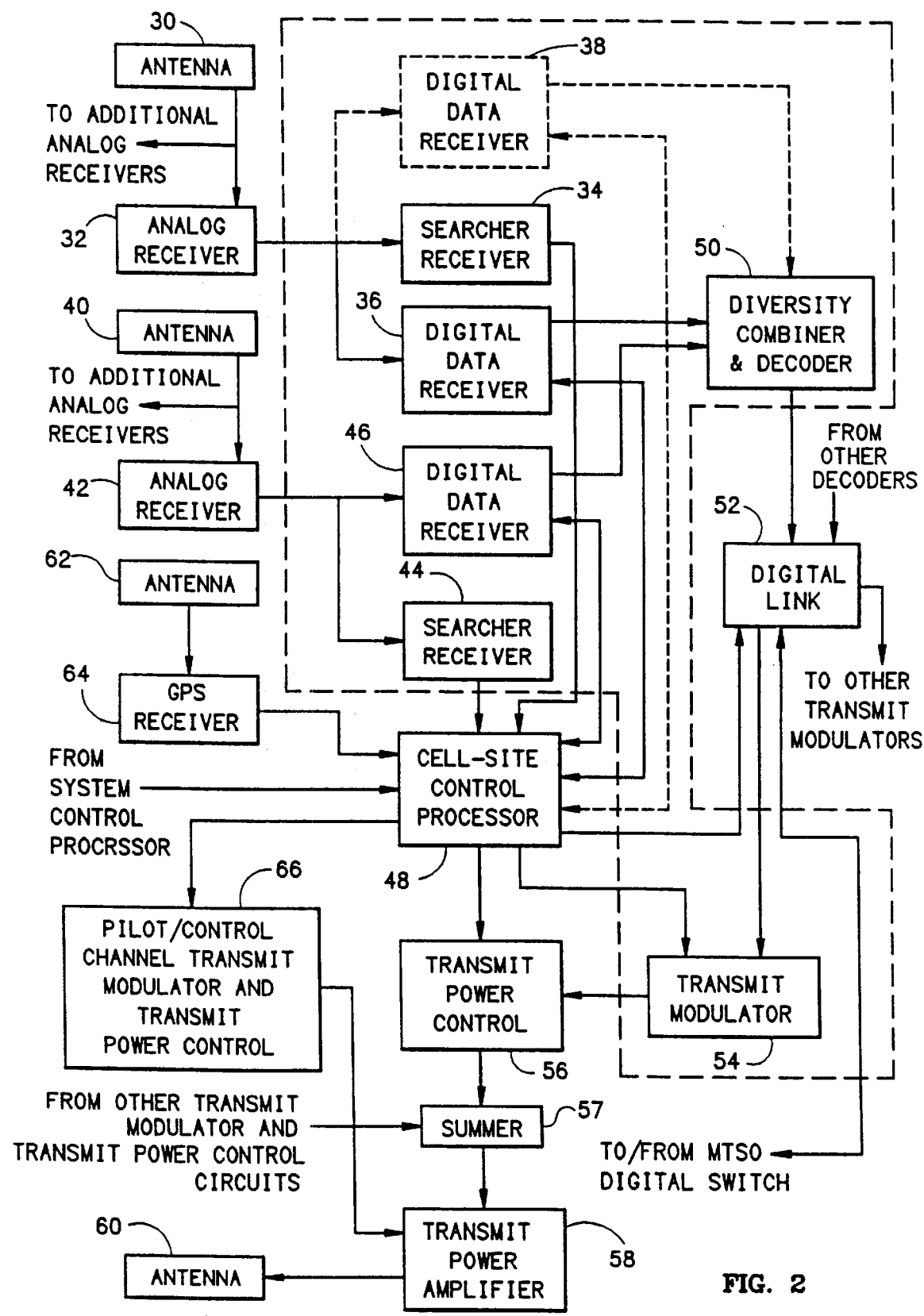
FIG. 2 is a block diagram of the cell-site equipment as implemented in the CDMA cellular telephone system.

FIG. 2 illustrates in block diagram form an exemplary embodiment cell-site equipment. At the cell-site, two receiver systems are utilized with each having a separate antenna and analog receiver for space diversity reception. In each of the receiver systems the signals are processed identically until the signals undergoes a diversity combination process. The elements within the dashed lines correspond to elements corresponding to the communications between the cell-site and one mobile unit. The output of the analog receivers are also provided to other elements used in communications with other mobile units.

In FIG. 2, the first receiver system is comprised of antenna 30, analog receiver 32, searcher receiver 34 and digital data receiver 36. The first receiver system may also include an optional digital data receiver, receiver 38. The second receiver system includes antenna 40, analog receiver 42, searcher receiver 44 and digital data receiver 46.

Figure 8:
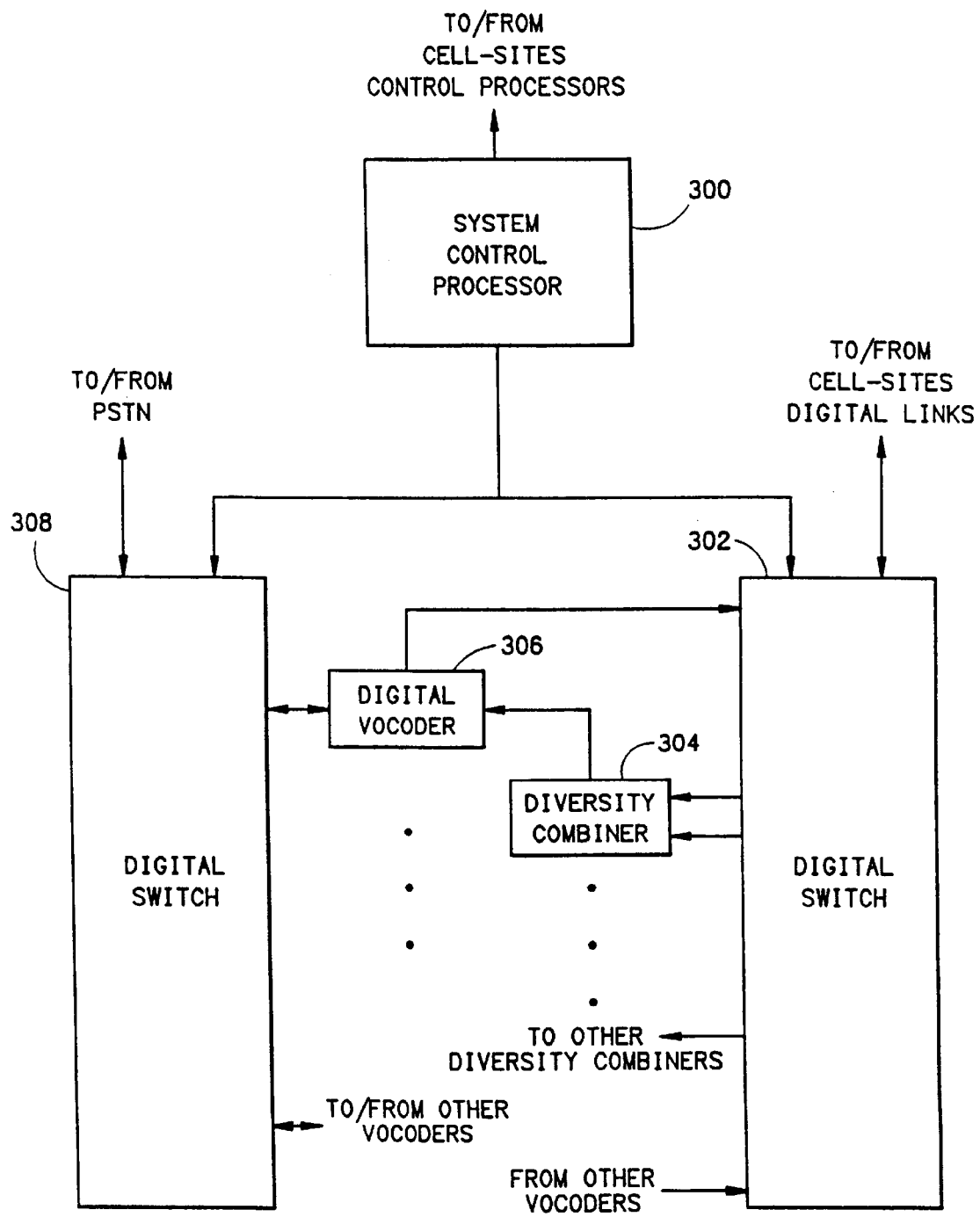
FIG. 8 is a block diagram of the mobile telephone switching office equipment.

The cell-site also includes cell-site control processor 48. Control processor 48 is coupled to data receivers 36, 38, and 46 along with searcher receivers 34 and 44. Control processor 48 provides among other functions, functions such as signal processing; timing signal generation; power control; and control over handoff, diversity, diversity combining and system control processor interface with the MTSO (FIG. 8). Walsh sequence assignment along with transmitter and receiver assignment is also provided by control processor 48.

Both receiver systems are coupled by data receivers 36, 38, and 46 to diversity combiner and decoder circuitry 50. Digital link 52 is coupled to receive the output of diversity combiner and decoder circuitry 50. Digital link 52 is also coupled to control processor 48, cell-site transmit modulator 54 and the MTSO digital switch. Digital link 52 is utilized to communicate signals to and from the MTSO (FIG. 8) with cell-site transmit modulator 54 and circuitry 50 under the control of control processor 48.

The mobile unit transmitted signals are direct sequence spread spectrum signals that are modulated by a PN sequence clocked at a predetermined rate, which in the preferred embodiment is 1.2288 MHz. This clock rate is chosen to be an integer multiple of the baseband data rate of 9.6 Kbps.

Signals received on antenna 30 are provided to analog receiver 32. The details of receiver 32 are further illustrated in FIG. 3. Signals received on antenna 30 are provided to downconverter 100 which is comprised of RF amplifier 102 and mixer 104. The received signals are provided as an input to RF amplifier where they are amplified and output to an input to mixer 104. Mixer 104 is provided another input, that being the output from frequency synthesizer 106. The amplified RF signals are translated in mixer 104 to an IF frequency by mixing with the frequency synthesizer output signal.

Figure 3:
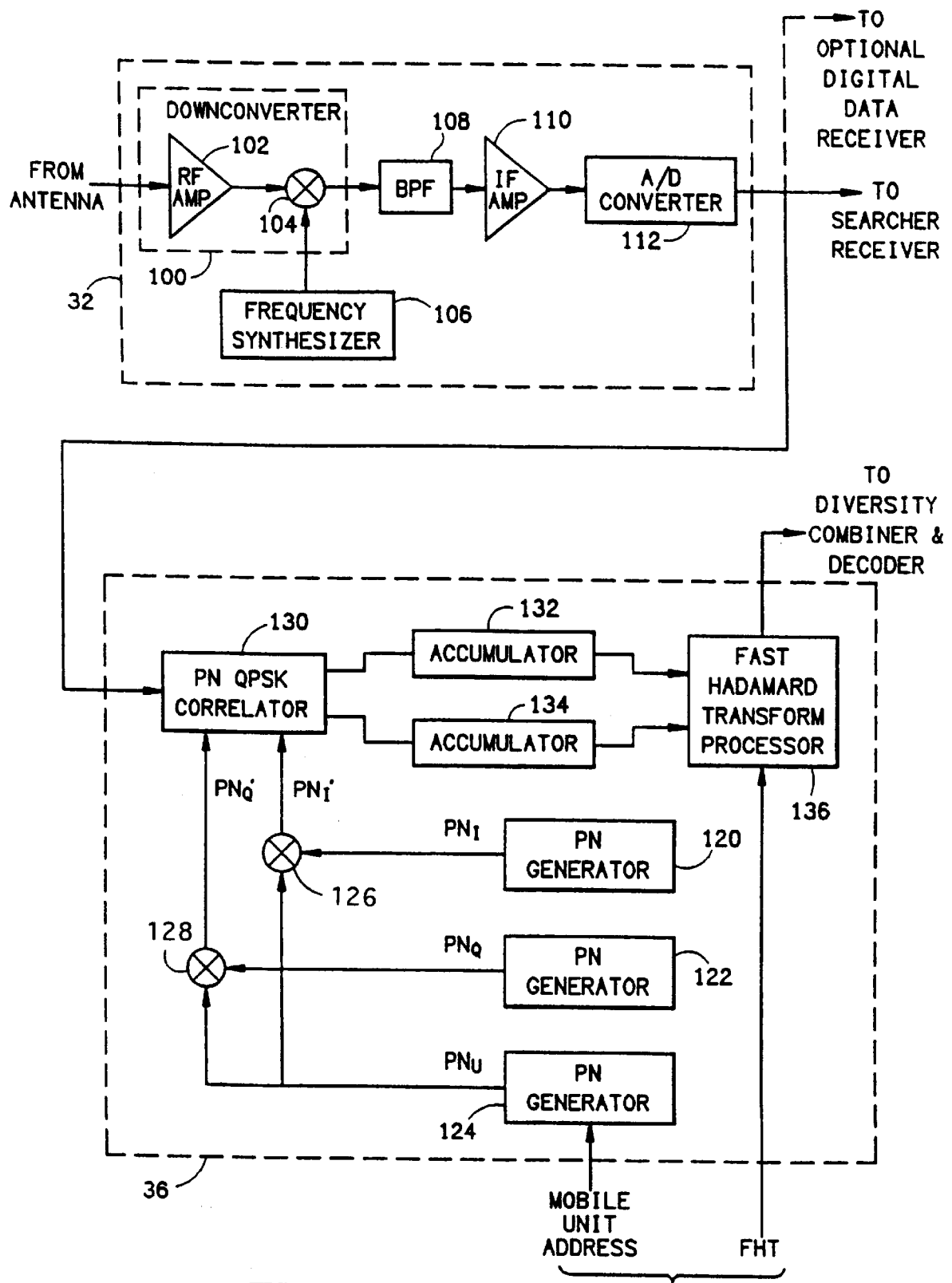
FIG. 3 is a block diagram of the cell-site receiver.

The IF signals are then output from mixer 104 to bandpass filter (BPF) 108, typically a Surface Acoustic Wave (SAW) filter having a passband of 1.25 MHz, where they are bandpass filtered. The filtered signals are output from BPF 108 to IF amplifier 110 where the signals are amplified. The amplified IF signals are output from IF amplifier 110 to analog to digital (A/D) converter 112 where they are digitized at a 9.8304 MHz clock rate which is exactly 8 times the PN chip rate. Although A/D converter 112 is illustrated as part of receiver 32, it could instead be a part of the data and searcher receivers. The digitized IF signals are output from A/D converter 112 to data receiver 36, optional data receiver 38 and searcher receiver 34. The signals output from receiver 32 are I and Q channel signals as discussed later. Although as illustrated in FIG. 3 with A/D converter 112 being a single device, with later splitting of the I and Q channel signals, it is envisioned that channel splitting may be done prior to digitizing with two separate A/D converters provided for digitizing the I and Q channels. Schemes for the RF-IF-Baseband frequency downconversion and analog to digital conversion for I and Q channels are well known in the art.

Searcher receiver 34 is used to at the cell-site to scan the time domain about the received signal to ensure that the associated digital data receiver 36, and data receiver 38 if used, are tracking and processing the strongest available time domain signal. Searcher receiver 64 provides a signal to cell-site control processor 48 which provides control signals to digital data receivers 36 and 38 for selecting the appropriate received signal for processing.

The signal processing in the cell-site data receivers and searcher receiver is different in several aspects than the signal processing by similar elements in the mobile unit. In the inbound, i.e. reverse or mobile-to-cell link, the mobile unit does not transmit a pilot signal that can be used for coherent reference purposes in signal processing at the cell-site. The mobile-to-cell link is characterized by a non-coherent modulation and demodulation scheme using 64-ary orthogonal signaling.

In the 64-ary orthogonal signaling process, the mobile unit transmitted symbols are encoded into one of $2^6$, i.e. 64, different binary sequences. The set of sequences chosen are known as Walsh functions. The optimum receive function for the Walsh function m-ary signal encoding is the Fast Hadamard Transform (FHT).

Referring again to FIG. 2, searcher receiver 34 and digital data receivers 36 and 38, receive the signals output from analog receiver 32. In order to decode the spread spectrum signals transmitted to the particular cell-site receiver through which the mobile unit communicates, the proper PN sequences must be generated. Further details on the generation of the mobile unit signals are discussed later herein.

As illustrated in FIG. 3, receiver 36 includes two PN generators, PN generators 120 and 122, which generate two different short code PN sequences of the same length. These two PN sequences are common to those of all cell-site receivers and all mobile units with respect to the outer code of the modulation scheme as discussed in further detail later herein. PN generators 120 and 122 thus respectively provide the output sequences, $PN_I$ and $PN_Q$. The $PN_I$ and $PN_Q$ sequences are respectively referred to as the In-Phase (I) and Quadrature (Q) channel PN sequences.

The two PN sequences, $PN_I$ and $PN_Q$, are generated by different polynomials of degree 15, augmented to produce sequences of length 32768 rather than 32767 which would normally be produced. For example, the augmentation may appear in the form of the addition of a single zero to the run of fourteen 0's in a row which appears one time in every maximal-length linear sequence of degree 15. In other words, one state of the PN generator would be repeated in the generation of the sequence. Thus the modified sequence contains one run of fifteen 1's and one run of fifteen 0's. Such a PN generator circuit is disclosed in U.S. Pat. No. 5,228,054, entitled "POWER OF TWO LENGTH PSEUDO-NOISE SEQUENCE GENERATOR WITH FAST OFFSET ADJUSTMENTS", and assigned to the assignee of the present invention.

In the exemplary embodiment receiver 36 also includes a long code PN generator 124 which generates a $PN_U$ sequence corresponding to a PN sequence generated by the mobile unit in the mobile-to-cell link. PN generator 124 can be a maximal-length linear sequence generator that generates a user PN code that is very long, for example degree 42, time shifted in accordance with an additional factor such as the mobile unit address or user ID to provide discrimination among users. Thus the cell-site received signal is modulated by both the long code $PN_U$ sequence and the short code $PN_I$ and $PN_Q$ sequences. In the alternative, a non-linear encryption generator, such as an encryptor using the data encryption standard (DES) to encrypt a 64-symbol representation of universal time using a user specific key, may be utilized in place of PN generator 124.

The $PN_U$ sequence output from PN generator 124 is exclusive-OR'ed with the $PN_I$ and $PN_Q$ sequences respectively in exclusive-OR gates 126 and 128 to provide the sequences $PN_I'$ and $PN_Q'$.

The sequences $PN_I'$ and $PN_Q'$ are provided to PN QPSK correlator 130 along with the I and Q channel signals output from receiver 32. Correlator 130 is utilized to correlate the I and Q channel data with the $PN_I'$ and $PN_Q'$ sequences. The correlated I and Q channel outputs of correlator 130 are respectively provided to accumulators 132 and 134 where the symbol data is accumulated over a 4-chip period. The outputs of accumulators 132 and 134 are provided as inputs to Fast Hadamard Transform (FHT) processor 136. FHT processor 148 produces a set of 64 coefficients for every 6 symbols. The 64 coefficients are then multiplied by a weighting function generated in control processor 48. The weighting function is linked to the demodulated signal strength. The weighted data output from FHT 136 is provided to diversity combiner and decoder circuitry 50 (FIG. 2) for further processing.

The second receiver system processes the received signals in a manner similar to that discussed with respect to the first receiver system of FIGS. 2 and 3. The weighted 64 symbols output from receivers 36 and 46 are provided to diversity combiner and decoder circuitry 40. Circuitry 50 includes an adder which adds the weighted 64 coefficients from receiver 36 to the weighted 64 coefficients from receiver 46. The resulting 64 coefficients are compared with one another in order to determine the largest coefficient. The magnitude of the comparison result, together with the identity or the largest of the 64 coefficients, is used to determine a set of decoder weights and symbols for use within a Viterbi algorithm decoder implemented in circuitry 50.

The Viterbi decoder contained within circuitry 50 is of a type capable of decoding data encoded at the mobile unit with a constraint length K=9, and of a code rate r=⅓. The Viterbi decoder is utilized to determine the most likely information bit sequence. Periodically, nominally 1.25 msec, a signal quality estimate is obtained and transmitted as a mobile unit power adjustment command along with data to the mobile unit. Further information on the generation of this quality estimate is discussed in further detail in the copending application mentioned above. This quality estimate is the average signal-to-noise ratio over the 1.25 msec interval.

Each data receiver tracks the timing of the received signal it is receiving. This is accomplished by the well known technique of correlating the received signal by a slightly early local reference PN and correlating the received signal with a slightly late local reference PN. The difference between these two correlations will average to zero if there is no timing error. Conversely, if there is a timing error, then this difference will indicate the magnitude and sign of the error and the receiver's timing is adjusted accordingly.

The cell-site further includes antenna 62 which is coupled to GPS receiver 64. GPS receiver processes signals received on antenna 62 from satellites in the Navstar Global Positioning System satellite navigation system so as to provide timing signals indicative of Universal Coordinated Time (UTC). GPS receiver 64 provides these timing signals to control processor 48 for timing synchronizing at the cell-site as discussed previously.

In FIG. 2 optional digital data receiver 38 may be included for improved performance of the system. The structure and operation of this receiver is similar to that described with reference to the data receivers 36 and 46. Receiver 38 may be utilized at the cell-site to obtain additional diversity modes. This additional data receiver alone or in combination with additional receivers can track and receive other possible delay paths of mobile unit transmitted signals. Optional additional digital data receivers such as receiver 38 provides additional diversity modes which are extremely useful in those cell-sites which are located in dense urban areas where many possibilities for multipath signals occur.

Signals from the MTSO are coupled to the appropriate transmit modulator via digital link 52 under control of control processor 48. Transmit modulator 54 under control of control processor 48 spread spectrum modulates the data for transmission to the intended recipient mobile unit. Further details with respect to the structure and operation of transmit modulator 54 are discussed below with reference to FIGS. 4a–4c.

The output of transmit modulator 54 is provided to transmit power control circuitry 56 where under the control of control processor 48 the transmission power may be controlled. The output of circuitry 56 is provided to summer 57 where it is summed with the output of transmit modulator/transmit power control circuits directed to other mobiles in the cell. The output of summer 57 is provided to transmit power amplifier circuitry 58 where output to antenna 60 for radiating to mobile units within the cell service area. FIG. 2 further illustrates pilot/control channel generators and transmit power control circuitry 66. Circuitry 66 under control of control processor generates and power controls the pilot signal, the sync channel, and the paging channel for coupling to circuitry 58 and output to antenna 60.

Figure 4A:
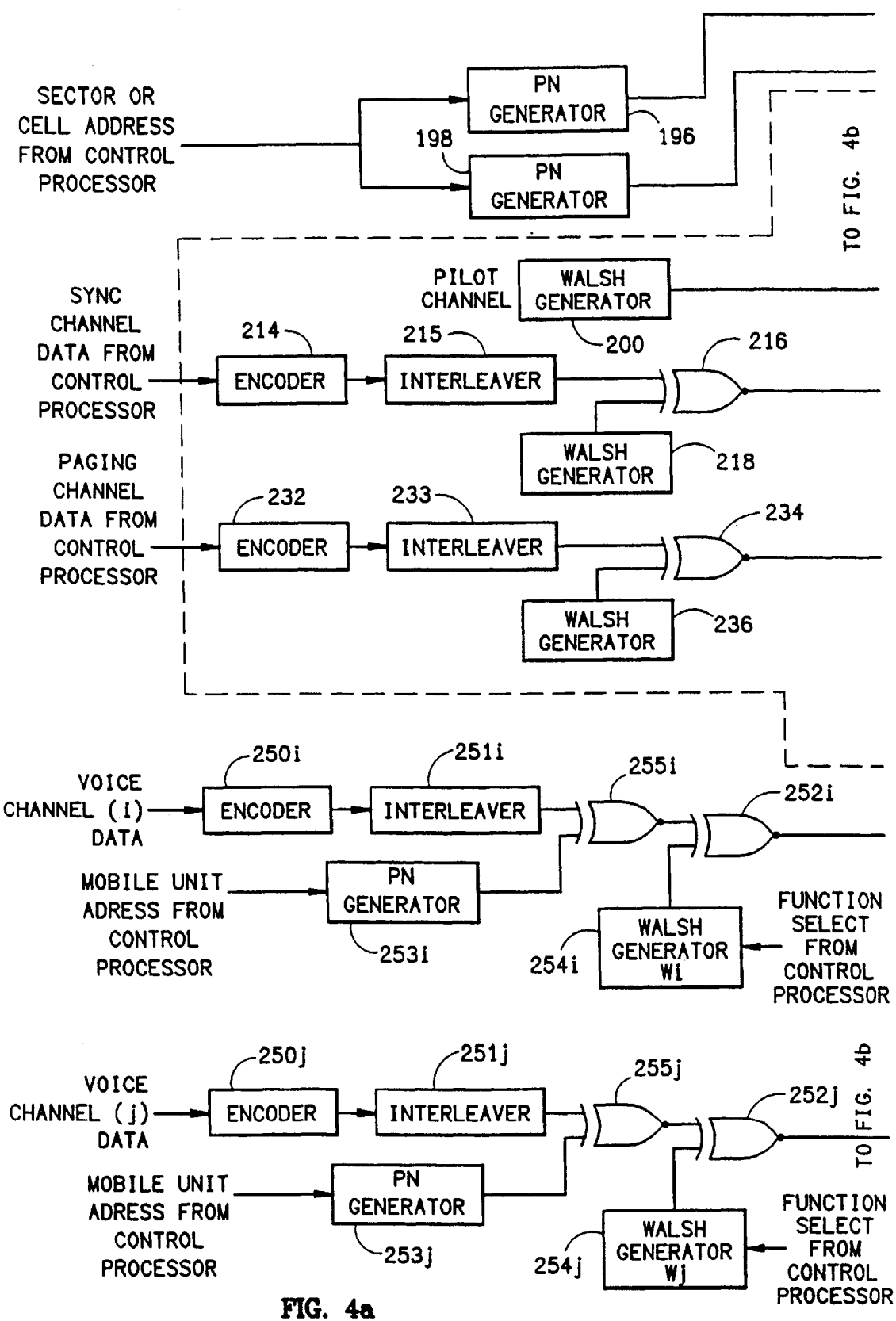
FIGS. 4a–4c is a block diagram of the cell-site transmit modulator.
Figure 4B:
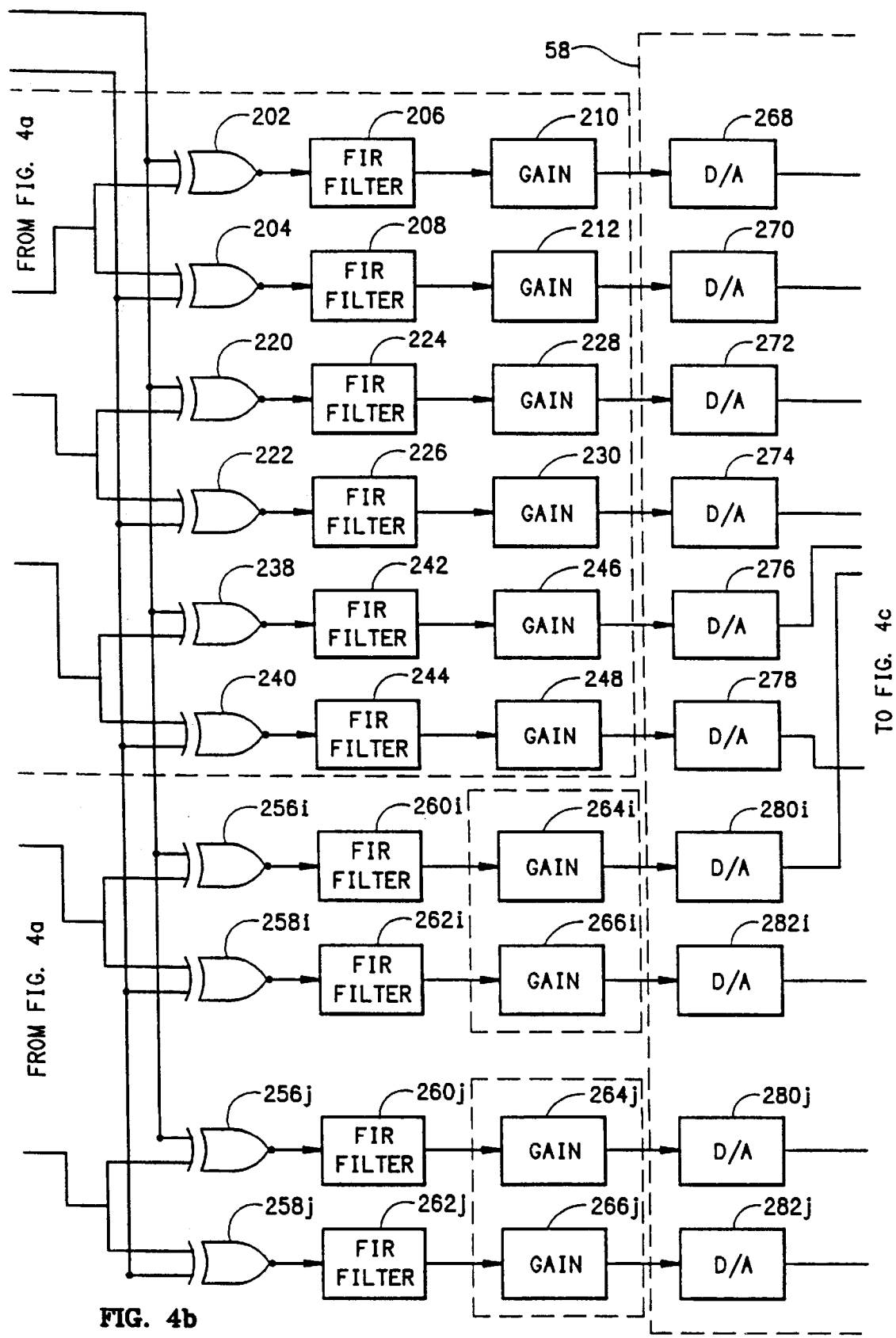
Figure 4C:
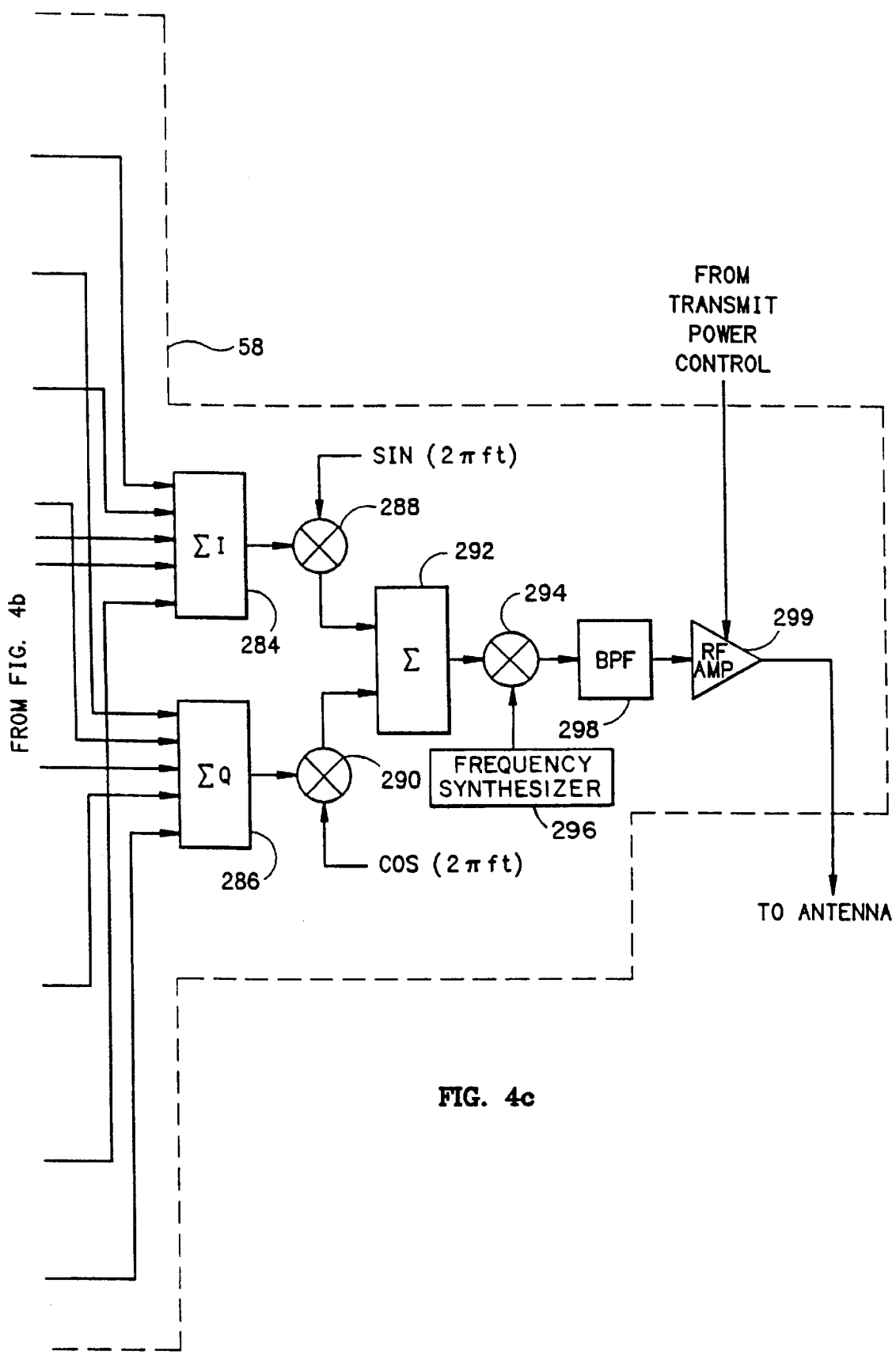

A block diagram of an exemplary embodiment of the cell-site transmitter is illustrated in FIGS. 4a–4c. The transmitter includes a pair of PN sequence generators used in generating the outer code. These PN generators generate two different PN sequences, i.e. the $PN_I$ and $PN_Q$ sequences, as was discussed with reference to FIG. 3. However, these $PN_I$ and $PN_Q$ sequences are delayed in time according to the sector or cell address.

In FIGS. 4a–4c, the transmitter circuitry of FIG. 2 is illustrated in further detail with the pilot, sync, paging and voice channel signals. The transmitter circuitry includes two PN generators, PN generators 196 and 198, which generate the $PN_I$ and $PN_Q$ sequences. PN generators 196 and 198 are responsive to an input signal corresponding to a sector or cell address signal from the control processor so as to provide a predetermined time delay to the PN sequences. These time delayed $PN_I$ and $PN_Q$ sequences again relate respectively to the In-Phase (I) and Quadrature (Q) channels. Although only two PN generators are illustrated for respectively generating the $PN_I$ and $PN_Q$ sequences for the corresponding channels of the cell-site or sector, it should be understood that many other PN generator schemes may be implemented. For example, in a unsectorized cell, a pair of PN generators may be provided for each of the pilot, sync, paging and voice channels to produce, in synchronization, the $PN_I$ and $PN_Q$ sequences used in the outer code. Such a case may be advantageous to avoid distributing the $PN_I$ and $PN_Q$ sequences throughout a large number of circuits.

In the preferred embodiment, Walsh function encoding of the channel signals is employed as the inner code. In the exemplary numerology as disclosed herein, a total of 64 different Walsh sequences are available with three of these sequences dedicated to the pilot, sync and paging channel functions. In the sync, paging and voice channels, input data is convolutionally encoded and then interleaved as is well known in the art. Furthermore, the convolutional encoded data is also provided with repetition before interleaving as is also well known in the art.

The pilot channel contains no data modulation and is characterized as an unmodulated spread spectrum signal that all of the users of a particular cell-site or sector use for acquisition or tracking purposes. Each cell, or if divided into sectors, each sector has a unique pilot signal. However, rather than using different PN generators for the pilot signals, it is realized that a more efficient way to generate different pilot signals is to use shifts in the same basic sequence. Utilizing this technique a mobile unit sequentially searches the whole sequence and tunes to the offset or shift that produces the strongest correlation. In using this shift of the basic sequence, the shifts must be such that the pilots in adjacent cells or sectors must not interfere or cancel.

The pilot sequence must therefore be long enough that many different sequences can be generated by shifts in the basic sequence to support a large number of pilot signals in the system. Furthermore, the separation or shifts must be great enough to ensure that there is no interference in pilot signals. Accordingly, in a exemplary embodiment of the present invention the pilot sequence length is chosen to be $2^{15}$. The sequence is generated started by a sequence $2^{15}-1$ with an extra 0 appended to the sequence when a particular state is detected. In the exemplary embodiment there are chosen to be 512 different pilot signals with offsets in the basic sequence of 64 chips. However, offsets may be integer multiples of the 64 chip offset with a corresponding reduction in the number of different pilot signals.

In generating the pilot signal, the Walsh "zero" ($W_0$) sequence which consists of all zeroes is used so as to not modulate the pilot signal, which in essence is the $PN_I$ and $PN_Q$ sequences. The Walsh "zero" ($W_0$) sequence is therefore multiplied by the $PN_I$ and $PN_Q$ sequences in exclusive-OR gates. The resulting pilot signal thus contains only the $PN_I$ and $PN_Q$ sequences. With all cell-sites and sectors having the same PN sequence for the pilot signal, the distinguishing feature between cell-sites or sectors of origination of the transmission is the phase of the sequence.

With respect to the portion of transmit modulator and power control circuitry 66 for the pilot channel, Walsh generator ($W_0$) 200 generates a signal corresponding to the all zero function as just discussed. The timing in the generation of the Walsh function is provided by the control processor, as in the case of all Walsh function generators in the cell-site and mobile unit. The output of generator 200 is provided as an input to both of exclusive-OR gates 202 and 204. The other input of exclusive-OR gate 202 receives the $PN_I$ signal while the other input of exclusive-OR gate 204 receives the $PN_Q$ signal. The $PN_I$ and $PN_Q$ signals are respectively exclusive-OR'ed with the output of generator 200 and respectively provided as inputs to Finite Impulse Response (FIR) filters 206 and 208. The filtered signals output from FIR filters 206 and 208 provided to a transmit power control circuitry comprised of gain control elements 210 and 212. The signals provided to gain control elements 210 and 212 are gain controlled in response to input signals (not shown) from the control processor. The signals output from gain control elements are provided to transmit power amplifier circuitry 58 whose detailed structure and function is described later herein.

The sync channel information is encoded and then multiplied in exclusive-OR gates by a preassigned Walsh sequence. In the exemplary embodiment, the selected Walsh function is the ($W_{32}$) sequence which consists of a sequence of 32 "ones" followed by 32 "zeros". The resulting sequence is then multiplied by the $PN_I$ and $PN_Q$ sequences in exclusive-OR gates.

In the exemplary embodiment the sync channel data information is provided to the transmit modulator typically at a rate of 1200 bps. In the exemplary embodiment the sync channel data is preferably convolutionally encoded at a rate r=½ with a constraint length K=9, with each code symbol repeated twice. This encoding rate and constraint length is common to all encoded forward link channels, i.e. sync, paging and voice. In an exemplary embodiment, a shift register structure is employed for the generators of the code $G_1=753$ (octal) and $G_2=561$ (octal). The symbol rate to the sync channel is in the exemplary embodiment 4800 sps, i.e. one symbol is 208 $\mu$sec or 256 PN chips.

The code symbols are interleaved by means of a convolutional interleaver spanning in the exemplary embodiment 40 msec. The tentative parameters of the interleaver are I=16 and J=48. Further details on interleaving is found in *Data Communication, Networks and Systems*, Howard W. Sams & Co., 1987, pp. 343–352. The effect of the convolutional interleaver is to disperse unreliable channel symbols such that any two symbols in a contiguous sequence of I-1 or fewer symbols are separated by at least J+1 symbols in a deinterleaver output. Equivalently, any two symbols in a contiguous sequence of J-1 symbols are separated by at least I+1 symbols at the deinterleaver output. In other words, if I=16 and J=48, in a string of 15 symbols, the symbols are transmitted separated by 885 $\mu$sec, thus providing time diversity.

Figure 5:
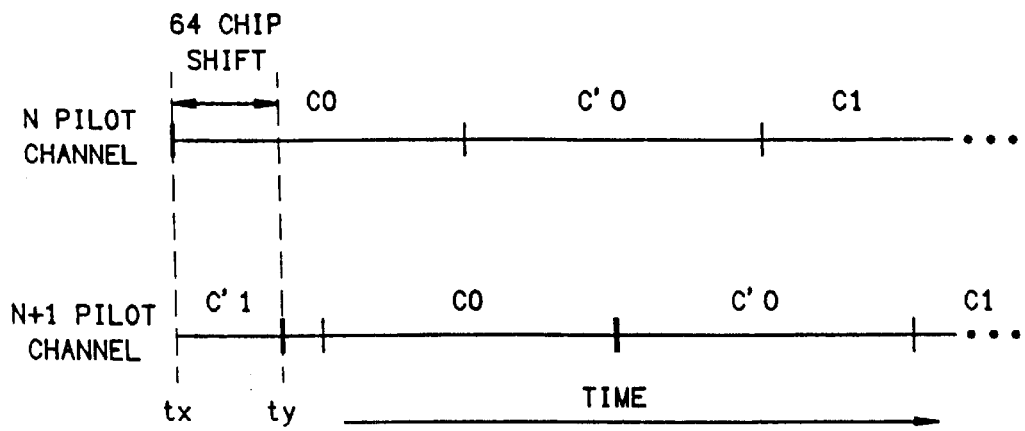
FIG. 5 is an exemplary timing diagram of sync channel symbol synchronization.

The sync channel symbols of a particular cell or sector are tied to the corresponding pilot signal for that cell or sector. FIG. 5 illustrates the timing of two different pilot channels (N) and (N+1) which are separated by a shift of 64 chips. FIG. 5 illustrates only by way of example a timing diagram for the exemplary pilot and sync channels with the state of the actual pilot signal chips and sync channel symbols not illustrated. Each sync channel starts a new interleaver cycle with the first code symbol ($c_x$) of a code symbol pair ($c_x$, $c'_x$), due to a code repeat of two, shifted with respect to absolute time by an amount equal to the corresponding pilot.

As illustrated in FIG. 5, The N pilot channel starts a new interleaver cycle, or pilot sync, at the time $t_x$. Similarly, the N+1 pilot channel starts a new interleaver cycle or pilot sync at the time $t_y$ which occurs 64 chip later in time than time $t_x$. The pilot cycle in the exemplary embodiment is 26.67 msec long, which corresponds to 128 sync channel code symbols or 32 sync channel information bits. The sync channel symbols are interleaved by a convolutional interleaver which spans 26.67 msec. Thus, when the mobile unit has acquired the pilot signal, it has immediate sync channel interleaver synchronization.

Figure 6:
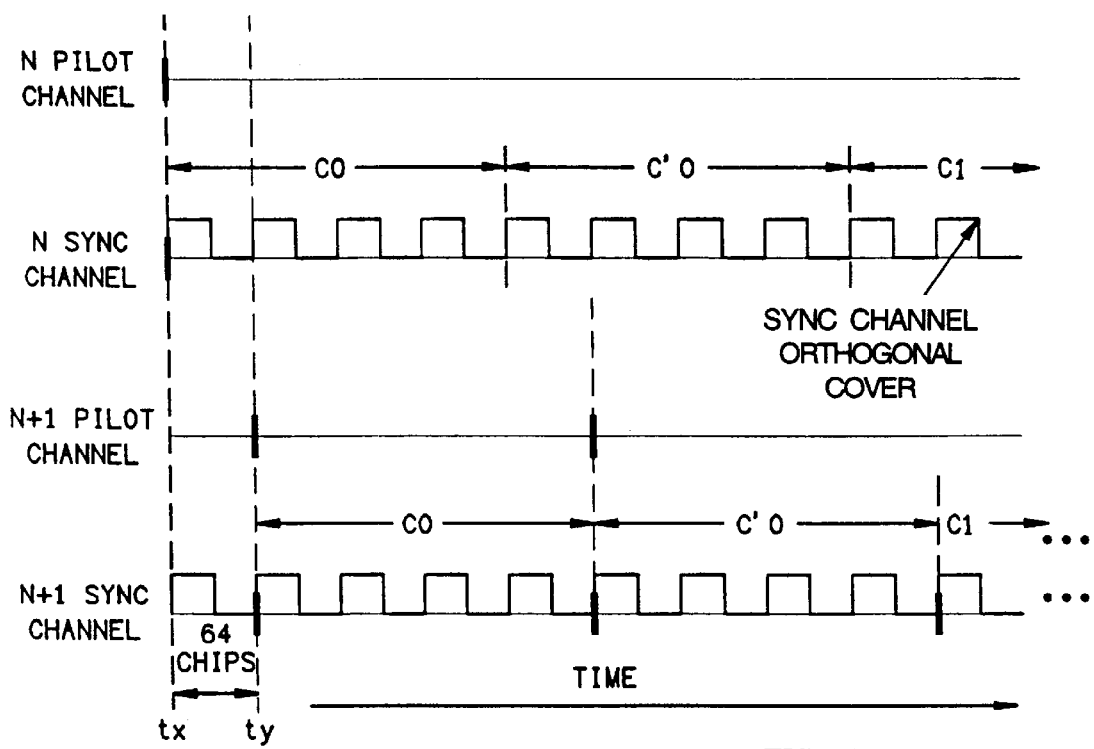
FIG. 6 is an exemplary timing diagram of sync channel timing with orthogonal covering.

The sync channel symbols are covered by the preassigned Walsh sequence to provide orthogonality in the signal. In the sync channel, one code symbol spans four cover sequences, i.e. one code symbol to four repetitions of the "32 one"–"32 zero" sequence, as illustrated in FIG. 6. As illustrated in FIG. 6, a single logical "one" represents the occurrence of 32 "one" Walsh chips while a single logical "zero" represents the occurrence of 32 "zero" Walsh chips. Orthogonality in the sync channel is still maintained even though the sync channel symbols are skewed with respect to absolute time depending upon the associated pilot channel because sync channel shifts are integer multiples of the Walsh frame.

The sync channel messages in the exemplary embodiment are variable in length. The length of the message is an integer multiple of 80 msec which corresponds to 3 pilot cycles. Included with the sync channel information bits are cyclic redundancy check code (CRCC) bits for error detection.

Figure 7:
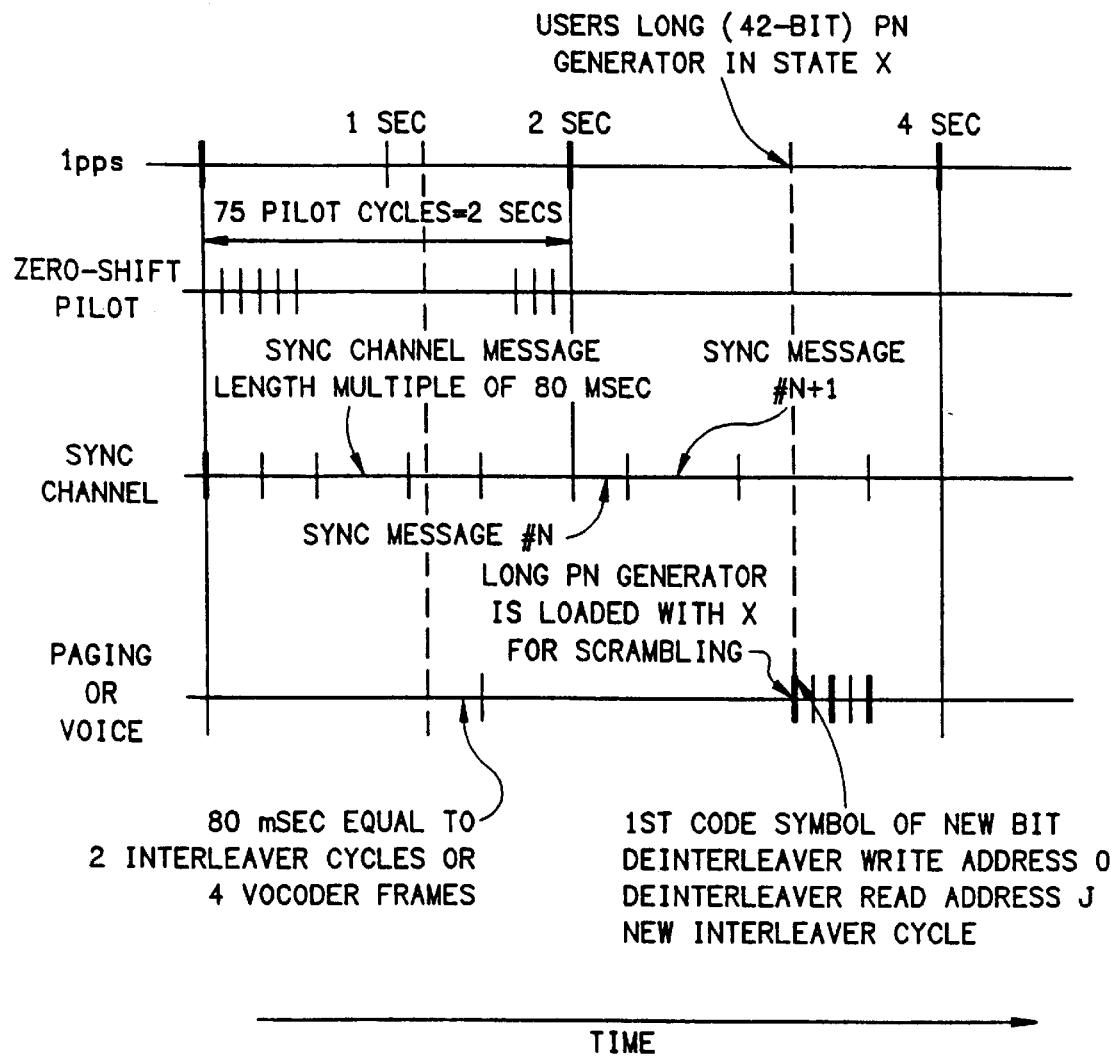
FIG. 7 is an exemplary timing diagram of the overall cell-to-mobile link timing.

FIG. 7 illustrates in the form of a timing diagram the overall exemplary system timing. In the period of two seconds there are 75 pilot cycles. In FIG. 7, the N pilot and sync channels correspond to the sector or cell using the unshifted pilot such that the pilot and sync signals align exactly with UTC time. As such the pilot sync, i.e. initial state, aligns exactly with a common 1 pulse per second (pps) signal.

In all cases in which a shifted pilot is used, a PN phase offset corresponding to the pilot shift is introduced. In other words, pilot sync (initial state) and sync channel messages are skewed with respect to the 1 pps signals. The sync messages carries this phase offset information so that the mobile unit can adjusts its timing accordingly.

As soon as a sync channel message has been correctly received, the mobile unit has the ability to immediately synchronize to either a paging channel or a voice channel. At pilot sync, corresponding to the end of each sync message, a new 40 msec interleaver cycle begins. At that time, the mobile unit starts deinterleaving the first code symbol of either a code repetition, or a ($c_x$, $c_{x+1}$) pair, with decoder synchronization achieved. The deinterleaver write address is initialized to 0 and the read address is initialized to J, memory deinterleaver synchronization is achieved.

The sync channel messages carry information regarding the state of a 42-bit long PN generator for the voice channel assigned for the communication with the mobile unit. This information is used at the mobile unit digital data receivers to synchronize the corresponding PN generators. For example, in FIG. 7 the sync channel message N+1 contains a 42-bit field which is indicative of the state, state X, that the sector or cell voice channel corresponding long code PN generator will have at a predetermined later time, such as 160 msec later. The mobile unit, after successfully decoding a sync channel message, loads at the correct instant of time the long code PN generator with the state X. The mobile unit long code PN generator is thus synchronized to permit descrambling of the user intended messages.

With respect to the portion of transmit modulator and power control circuitry 66 for the sync channel, the sync channel information is input from the control processor to encoder 214. The sync channel data in the exemplary embodiment is, as discussed above, convolutional encoded by encoder 214. Encoder 214 further provides repetition of the encoded symbols, in the case of the sync channel the encoded symbols are repeated. The symbols output from encoder 214 are provided to interleaver 215 which provides convolutional interleaving of the symbols. The interleaved symbols output from interleaver 215 are provided as an input to exclusive-OR gate 216.

Walsh generator 218 generates a signal corresponding to the Walsh ($W_{32}$) sequence that is provided as the other input to exclusive-OR gate 216. The sync channel symbol stream and the Walsh ($W_{32}$) sequence are exclusive-OR'ed by exclusive-OR gate 216 with the result thereof provided as an input to both of exclusive-OR gates 220 and 222.

The other input of exclusive-OR gate 220 receives the $PN_I$ signal while the other input of exclusive-OR gate 222 receives the $PN_Q$ signal. The $PN_I$ and $PN_Q$ signals are respectively exclusive-OR'ed with the output of exclusive-OR gate 218 and respectively provided as inputs to Finite Impulse Response (FIR) filters 224 and 226. The filtered signals output from FIR filters 224 and 226 provided to a transmit power control circuitry comprised of digital variable gain control elements 228 and 230. The signals provided to gain control elements 228 and 230 are digitally gain controlled in response to input digital signals (not shown) from the control processor. The signals output from gain control elements 228 and 230 are provided to transmit power amplifier circuitry 58.

The paging channel information is also encoded with repetition, interleaved and then multiplied by a preassigned Walsh sequence. The resulting sequence is then multiplied by the $PN_I$ and $PN_Q$ sequences. The data rate of the paging channel for a particular sector or cell is indicated in an assigned field in the sync channel message. Although the paging channel data rate is variable, it is in the exemplary embodiment fixed for each system at one of the following exemplary data rates: 9.6, 4.8, 2.4 and 1.2 kbps.

With respect to the transmit modulator and power control circuitry of the paging channel, the paging channel information is input from the control processor to encoder 232. Encoder 232 is in the exemplary embodiment a convolutional encoder that also provides repetition of the symbols according to the assigned data rate of the channel. The output of encoder 232 is provided to interleaver 233 where the symbols are convolutional interleaved. The output from interleaver 233 is provided as an input to exclusive-OR gate 234. Although the paging channel data rate will vary, the code symbol rate is kept constant at 19.2 ksps by code repetition.

Walsh generator 236 generates a signal, corresponding to a preassigned Walsh sequence, that is provided as the other input to exclusive-OR gate 234. The symbol data and Walsh sequence are exclusive-OR'ed by exclusive-OR gate 234 and provided as an input to both of exclusive-OR gates 238 and 240.

The other input of exclusive-OR gate 238 receives the $PN_I$ signal while the other input of exclusive-OR gate 240 receives the $PN_Q$ signal. The $PN_I$ and $PN_Q$ signals are respectively exclusive-OR'ed with the output of exclusive-OR gate 234 and respectively provided as inputs to Finite Impulse Response (FIR) filters 242 and 244. The filtered signals output from FIR filters 242 and 244 are provided to a transmit power control circuitry comprised of gain control elements 246 and 248. The signals provided to gain control elements 246 and 248 are gain controlled in response to input signals (not shown) from the control processor. The signals output from gain control elements are provided to transmit power amplifier circuitry 58.

The data of each voice channel is also encoded with repetition, interleaved, scrambled, multiplied by its assigned Walsh sequence ($W_i$–$W_j$), and then multiplied by the $PN_I$ and $PN_Q$ sequences. The Walsh sequence to be used by a particular channel is assigned by the system controller at call setup time in the same manner as channels are assigned to calls in the analog FM cellular system. In the exemplary embodiment illustrated herein, up to 61 different Walsh sequences are available for use by the voice channels.

In the exemplary embodiment of the present invention, the voice channel utilizes a variable data rate. The intent in using a variable data rate is to lower the data rate when there is no voice activity thereby reducing interference generated by this particular voice channel to other users. The vocoder envisioned to provide variable rate data is disclosed in U.S. Pat. No. 5,414,796, entitled "VARIABLE RATE VOCODER", also assigned to the assignee of the present invention. Such a vocoder produces data at four different data rates based on voice activity on a 20 msec frame basis. Exemplary data rates are 9.6 kbps, 4.8 kbps, 2.4 kbps and 1.2 kbps. Although the data rate will vary on a 20 msec basis, the code symbol rate is kept constant by code repetition at 19.2 ksps. Accordingly, the code symbols are repeated 2, 4 and 8 times for the respective data rates 4.8 kbps, 2.4 kbps and 1.2 kbps.

Since the variable rate scheme is devised to reduce interference, the code symbols at the lower rates will have lower energy. For example, for the exemplary data rates of 9.6 kbps, 4.8 kbps, 2.4 kbps and 1.2 kbps, the code symbol energy (Es) is respectively $E_b/2$, $E_b/4$, $E_b/8$ and $E_b/16$ where $E_b$ is the information bit energy for the 9.6 kbps transmission rate.

The code symbols are interleaved by a convolutional interleaver such that code symbols with different energy levels will be scrambled by the operation of the interleaver. In order to keep track of what energy level a code symbol should have a label is attached to each symbol specifying its data rate for scaling purposes. After orthogonal Walsh covering and PN spreading, the quadrature channels are digitally filtered by a Finite Impulse Response (FIR) filter. The FIR filter will receive a signal corresponding to the symbol energy level in order to accomplish energy scaling according to the data rate. The I and Q channels will be scaled by factors of: 1, $1/\sqrt{2}$, ½, or $½\sqrt{2}$. In one implementation the vocoder would provide a data rate label in the form of a 2-bit number to the FIR filter for controlling the filter scaling coefficient.

In FIGS. 4a–4c, the circuitry of two exemplary voice channels, voice channels (i) and (j) are illustrated. The voice channel (i) data is input from an associated vocoder (not shown) to transmit modulator 54 (FIG. 3). Transmit modulator 54 is comprised of encoder 250$_i$; interleaver 251$_i$; exclusive-OR gates 252$_i$, 255$_i$, 256$_i$ and 258$_i$; PN generator 253$_i$; and Walsh generator ($W_i$) 254$_i$.

The voice channel (i) data is input to encoder 250$_i$ where in the exemplary embodiment it is convolutional encoded with code symbol repetition according to the input data rate. The encoded data is then provided to interleaver 251$_i$ where, in the exemplary embodiment, it is convolutional interleaved. Interleaver 251$_i$ also receives from the vocoder associated with the voice channel (i) a 2-bit data rate label that is interleaved with the symbol data to identify at the data rate to the FIR filters. The data rate label is not transmitted. At the mobile unit, the decoder checks for all possible codes. The interleaved symbol data is output from interleaver 251$_i$ at an exemplary rate of 19.2 ksps to an input of exclusive-OR gate 255$_i$.

In the exemplary embodiment, each voice channel signal is scrambled to provide greater security in cell-to-mobile transmissions. Although such scrambling is not required it does enhance the security in communications. For example, scrambling of the voice channel signals may be accomplished by PN coding the voice channel signals with a PN code determined by the mobile unit address of user ID. Such scrambling may use the $PN_U$ sequence or encryption scheme as discussed with reference to FIG. 3 with respect to the particular receiver for the mobile-to-cell communications. Accordingly, a separate PN generator may be implemented for this function as illustrated in FIG. 4a. Although scrambling is discussed with reference to a PN sequence, scrambling may be accomplished by other techniques including those well known in the art.

Referring again to FIGS. 4a–4c, scrambling of the voice channel (i) signal may be accomplished by providing PN generator 253$_i$ which receives the assigned mobile unit address from the control processor. PN generator 253$_i$ generates a unique PN code that is provided as the other input to exclusive-OR gate 255$_i$. The output of exclusive-OR gate 255$_i$ is provided to the one input of exclusive-OR gate 252$_i$.

Walsh generator ($W_i$) 254$_i$ generates, in response to a function select signal and timing signals from the control processor, a signal corresponding to a preassigned Walsh sequence. The value of the function select signal may be determined by the address of the mobile unit. The Walsh sequence signal is provided as the other input to exclusive-OR gate 252$_i$. The scrambled symbol data and Walsh sequence are exclusive-OR'ed by exclusive-OR gate 252$_i$ with the result provided as an input to both of exclusive-OR gates 256$_i$ and 258$_i$. PN generator 253$_i$ along with all other PN generators and Walsh generators at the cell-site provide an output at 1.2288 MHz. It should be noted that PN generator 253 includes a decimator which provides an output at a 19.2 kHz rate to exclusive-OR gate 255$_i$.

The other input of exclusive-OR gate 256$_i$ receives the $PN_I$ signal while the other input of exclusive-OR gate 258$_i$ receives the $PN_Q$ signal. The $PN_I$ and $PN_Q$ signals are respectively exclusive-OR'ed with the output of exclusive-OR gate 252$_i$ and respectively provided as inputs to Finite Impulse Response (FIR) filters 260$_i$ and 262$_i$. The input symbols are filtered according to the input data rate label (not shown) from convolutional interleaver 251$_i$. The filtered signals output from FIR filters 260$_i$ and 262$_i$ are provided to a portion of transmit power control circuitry 56 comprised of gain control elements 264$_i$ and 266$_i$. The signals provided to gain control elements 264$_i$ and 266$_i$ are gain controlled in response to input signals (not shown) from the control processor. The signals output from gain control elements are provided to transmit power amplifier circuitry 58.

In addition to voice bits, the forward link voice channel carries power control information. The power control bit rate is in the exemplary embodiment 800 bps. The cell-site receiver which is demodulating the mobile-to-cell signal from a given mobile, generates the power control information which is inserted in the cell-to-mobile voice channel addressed to that particular mobile. Further details on the power control feature is disclosed in the above identified copending application.

Power control bits are inserted at the output of the convolutional interleaver by means of a technique called code symbol puncturing. In other words, whenever a power control bit needs to be transmitted two code symbols are replaced by two identical code symbols with polarity given by the power control information. Moreover, power control bits are transmitted at the energy level corresponding to the 9600 bps bit rate.

An additional constraint imposed on the power control information stream is that the position of the bits must be randomized among mobile-to-cell channels. Otherwise the full energy power control bits would generate spikes of interference at regular intervals, thus diminishing the detectability of such bits.

FIGS. 4a–4c further illustrate voice channel (j) which is identical in function and structure to that of voice channel (i). It is contemplated that there exist many more voice channels (not illustrated) with the total of voice channel being up to 61 for the illustrated embodiment.

With respect to the Walsh generators of FIGS. 4a–4c, Walsh functions are a set of orthogonal binary sequences that can be easily generated by means well known in the art. The characteristic of interest in the Walsh function is that each of the 64 sequences is perfectly orthogonal to all of the other sequences. As such, any pair of sequences differ in exactly as many bit positions as they agree, i.e. 32 over an interval of 64 symbols. Thus when information is encoded for transmission by the Walsh sequences the receiver will be able to select any one of the Walsh sequences as a desired "carrier" signal. Any signal energy encoded onto the other Walsh sequences will be rejected and not result in mutual interference to the desired one Walsh sequence.

In the exemplary embodiment for the cell-to-mobile link, the sync, paging and voice channels as mentioned previously use convolutional encoding of a constraint length K=9 and code rate r=½, that is, two encoded symbols are produced and transmitted for every information bit to be transmitted. In addition to the convolutional encoding, convolutional interleaving of symbol data is further employed. It is further envisioned that repetition is also utilized in conjunction with the convolutional encoding. At the mobile unit the optimum decoder for this type of code is the soft decision Viterbi algorithm decoder. A standard design can be used for decoding purposes. The resulting decoded information bits are passed to the mobile unit digital baseband equipment.

Referring again to FIGS. 4a–4c, circuitry 58 includes series of digital to analog (D/A) converters for converting the digital information from the $PN_I$ and $PN_Q$ spread data for the pilot, sync, paging and voice channels to analog form. In particular the pilot channel $PN_I$ spread data is output from gain control element 210 to D/A converter 268. The digitized data is output from D/A converter 268 to an summer 284. Similarly, the output of the corresponding gain control elements for the sync, paging and voice channels $PN_I$ spread data, i.e. gain control elements 228, 246, and $264_i$–$264_j$, are respectively provided to D/A converters 272, 276 and $280_i$–$280_j$ where the signals are digitized and provided to summer 284. The $PN_Q$ spread data for the pilot, sync, paging and voice channels are output from gain control elements 221, 230, 248, and $266_i$–$266_j$, are respectively provided to D/A converters 270, 274, 278 and $282_i$–$282_j$ where the signals are digitized and provided to summer 286.

Summer 284 sums the $PN_I$ spread data for the pilot, sync, paging and voice channels and while summer 286 sums the and $PN_Q$ spread data for the same channels. The summed I and Q channel data is respectively input along with local oscillator (LO) frequency signals $Sin(2\pi ft)$ and $Cos(2\pi ft)$ to mixers 288 and 290 where they are mixed and provided to summer 292. The LO frequency signals $Sin(2\pi ft)$ and $Cos(2\pi ft)$ are provided from suitable frequency sources (not shown). These mixed IF signals are summed in summer 292 and provided to mixer 294.

Mixer 294 mixes the summed signal with an RF frequency signal provided by frequency synthesizer 296 so as to provide frequency upconversion to the RF frequency band. The RF signal output from mixer 294 is bandpass filtered by bandpass filter 298 and output to RF amplifier 299. Amplifier 299 amplifies the band limited signal in accordance with the input gain control signal from the transmit power control circuitry 56 (FIG. 3). It should be understood that the embodiment illustrated for transmit power amplifier circuitry 58 is merely for purposes of illustration with many variations in signal summing, mixing, filtering and amplification possible as is well known in the art.

Cell-site control processor 48 (FIG. 3) has the responsibility for assignment of digital data receivers and transmit modulators to a particular call. Control processor 48 also monitors the progress of the call, quality of the signals and initiates teardown on loss of signal. The cell-site communicates with the MTSO via link 52 where it is coupled by a standard telephone wire, optical fiber, or microwave link.

FIG. 8 illustrates in block diagram form the equipment utilized in the MTSO. The MTSO typically includes a system controller or control processor 300, digital switch 302, diversity combiner 304, digital vocoder 306 and digital switch 308. Although not illustrated additional diversity combiners and digital vocoders are coupled between digital switches 302 and 308.

When the cell-diversity mode is active, the call is processed by two cell-sites. Accordingly, signals will arrive at the MTSO from more than one cell-site with nominally the same information. However, because of fading and interference on the inbound or reverse link from the mobile unit to the cell-sites, the signal from one cell-site may be of better quality than the signal from the other cell-site.

Digital switch 302 is used in routing the information stream corresponding to a given mobile unit from one or more cell-sites to diversity combiner 304 or the corresponding diversity combiner as determined by a signal from system control processor 300. When the system is not in the cell diversity mode, diversity combiner 304 may be either bypassed or fed the same information on each input port.

A multiplicity of serial coupled diversity combiners and vocoder are provided in parallel, nominally one for each call to be processed. Diversity combiner 304 compares the signal quality indicators accompanying the information bits from the two or more cell-site signals. Diversity combiner 304 selects the bits corresponding to the highest quality cell-site on a frame-by-frame basis of the information for output to vocoder 306.

Vocoder 306 converts the format of the digitized voice signal to standard 64 Kbps PCM telephone format, analog, or any other standard format. The resultant signals is transmitted from vocoder 306 to digital switch 308. Under the control of system control processor 300, the call is routed to the PSTN.

Voice signals coming from the PSTN intended for the mobile units, are provided to digital switch 308 for coupling to an appropriate digital vocoder such as vocoder 306 under control of system control processor 300. Vocoder 306 encodes the input digitized voice signals and provides the resulting information bit stream directly to digital switch 302. Digital switch 302 under system control processor control direct the encoded data to the cell-site or cell-sites to which the mobile unit is communicating. Although discussed previously that information transmitted to the MTSO analog voice, it is further envisioned that digital information may also be communicated in the system. To ensure compatibility with the system, care must be taken in proper framing of the data.

If the mobile unit is in a handoff mode communicating to multiple cell-sites or in a cell diversity mode, digital switch 302 routes the calls to the appropriate cell-sites for transmission by the appropriate cell-site transmitter to the intended recipient mobile unit. However, if the mobile unit is communicating with only a single cell-site or not in a cell diversity mode, the signal is directed only to a single cell-site.

System control processor 300 provides control over digital switches 302 and 306 for routing data to and from the MTSO. System control processor 300 also determines the assignment of calls to the cell-sites and to the vocoders at the MTSO. Furthermore, system control processor 300 communicates with each cell-site control processor about the assignment of particular calls between the MTSO and cell-site, and the assignment of PN codes for the calls. It should be further understood that as illustrated in FIG. 8 digital switches 302 and 306 are illustrated as two separate switches, however, this function may be performed by a single physical switching unit.

When the cell-diversity mode is in use, the mobile unit will use the searcher receiver to identify and acquire the strongest multipath signal from each of the two cell-sites. The digital data receivers will be controlled by the searcher receiver and the control processor so as to demodulate the strongest signals. When the number of receivers is less than the number of cell-sites transmitting information in parallel, a switching diversity capability is possible. For example, with only a single data receiver and with two cell-sites transmitting, the searcher will monitor the pilots from both cell-sites and choose the strongest signal for the receiver to demodulate. In this embodiment the choice can be made as frequently as every vocoder frame, or about every 20 msec.

The system control processor has responsibility for assignment of digital data receivers and modulators at the cell-site to handle particular calls. Thus in the cell-to-mobile link, the system control processor controls the assignment of Walsh sequences used at the cell-site in transmission of a particular call to the mobile unit. In addition the system control processor controls the receiver Walsh sequences and PN codes. In the mobile-to-cell link, the system control processor also controls the mobile unit user PN codes for the call. Assignment information is therefore transmitted from the MTSO to the cell-site and from there to the cell to the mobile. The system control processor also monitors the progress of the call, the quality of signals, and initiates tear down on loss of signal.

Mobile-to Cell Link

In the mobile-to-cell link, the channel characteristics dictate that the modulation technique be modified. In particular, the use of a pilot carrier as is used in the cell-to-mobile link is no longer feasible. The pilot carrier must be more powerful than a voice carrier in order to provide a good phase reference for data modulation. With the cell-site transmitting many simultaneous voice carriers, a single pilot signal can be shared by all the voice carriers. Therefore, the pilot signal power per voice carrier is quite small.

In the mobile-to-cell link, however, there is usually only a single voice carrier per mobile. If a pilot were used, it would require significantly more power than the voice carrier. This situation is clearly not desirable since overall system capacity would be greatly reduced due to the interference caused by the presence of a larger number of high power pilot signals. Therefore, a modulation capable of efficient demodulation without a pilot signal must be used.

With the mobile-to-cell channel corrupted by Rayleigh fading, resulting in a rapidly varying channel phase, coherent demodulator techniques, such as a Costas loop which derives phase from the received signal, are not feasible. Other techniques such as differentially coherent PSK can be employed but fail to provide the desired level of signal-to-noise ratio performance.

Thus, a form of orthogonal signaling such as binary, quaternary or m-ary signaling should be employed. In the exemplary embodiment, a 64-ary orthogonal signaling technique is employed using Walsh functions. The demodulator for m-ary orthogonal signaling requires channel coherence only over the duration of transmission of the m-ary symbol. In the exemplary embodiment, this is only two bit times.

The message encoding and modulation process begins with a convolutional encoder of constraint length K=9 and code rate r=⅓. At a nominal data rate of 9600 bits per second, the encoder produces 28800 binary symbols per second. These are grouped into characters containing 6 symbols each at a rate of 4800 characters per second with there being 64 possible characters. Each character is encoded into a length 64 Walsh sequence containing 64 binary bits or "chips." The 64-ary Walsh chip rate is 307,200 chips per second in the exemplary embodiment.

The Walsh chips are then "covered" or multiplied by a PN sequence running at the rate of 1.2288 MHz. Each mobile unit is assigned a unique PN sequence for this purpose. This PN sequence can either be assigned only for the duration of the call or assigned permanently to the mobile unit. The assigned PN sequence is referred to herein as the user PN sequence. The user PN sequence generator runs at a clock rate of 1.2288 MHz and so as to produce four PN chips for every Walsh chip.

Finally, a pair of short, length 32768, PN sequences are generated. In the exemplary embodiment, the same sequences are used as for the cell-to-mobile link. The user PN sequence covered Walsh chip sequence is then covered or multiplied by each of the two short PN sequences. The two resulting sequences then bi-phase modulate a quadrature pair of sinusoids and are summed into a single signal. The resulting signal is then bandpass filtered, translated to the final RF frequency, amplified, filtered and radiated by the antenna of the mobile unit. As was discussed with reference to the cell-to-mobile signal, the ordering of the filtering, amplification, translation and modulation operations may be interchanged.

In an alternative embodiment, two different phases of the user PN code might be produced and used to modulate the two carrier phases of the quadraphase waveform, dispensing with the need for using the length 32768 sequences. In yet another alternative, the mobile-to-cell link might utilize only bi-phase modulation, also dispensing with the need for the short sequences.

The cell-site receiver for each signal produces the short PN sequences and the user PN sequence for each active mobile signal being received. The receiver correlates the received signal energy with each of the coded waveforms in separate correlators. Each of the correlator outputs is then separately processed to demodulate the 64-ary encoding and the convolutional coding using a Fast Hadamard Transform processor and a Viterbi algorithm decoder.

In another alternative modulation scheme for the mobile-to-cell link, the same modulation scheme would be used as for the cell-to-mobile link. Each mobile would utilize the pair of 32768 length sector codes as outer codes. The inner code would utilize a length 64 Walsh sequence that is assigned to the mobile for use while it is in that sector. Nominally, the same Walsh sequence would be assigned to the mobile for the mobile-to-cell link as is used for the cell-to-mobile link.

The above orthogonal PN coding scheme limits the available bandwidth spreading that can be used by the modulation system to a maximum rate of the chip rate divided by 64, or 19200 Hz for the numbers used in the exemplary embodiment. This would preclude the use of m-ary encoding with large m as described for the exemplary embodiment. As an alternative, however, a rate r=½, constraint length K=9 convolutional code could be used with differential binary phase shift keying modulation of the encoded binary symbols. The demodulator in the cell-site could build up a phase reference over a short interval using the technique described in the article "Nonlinear Estimation of PSK-Modulated Carrier with Application to Burst Digital Transmission", Andrew J. Viterbi and Audrey M. Viterbi, IEEE Transactions On Information Theory, Vol IT-29, No. 4, July 1983. For example, a phase reference could be averaged over only 4 symbols requiring no more channel coherence than the above 64-ary scheme.

The performance of the just described alternative scheme, however, will be inferior to the preferred embodiment in the presence of severe Rayleigh fading and multipath conditions. However, in certain environments where fading and multipath are less severe, for example, the satellite-mobile channel and in certain land-mobile channels, the performance of the alternative system could be better than the preferred embodiment. This can occur because the gain from making the mobile signals orthogonal to each other may exceed the loss in detection efficiency of the DPSK scheme.

In order to satisfy the requirement for time alignment in orthogonal Walsh functions for the alternative mobile-to-cell link, each cell receiver determines the time error from nominal timing of each received signal. If a given received signal lags in timing, then the associated cell modulator and transmitter will transmit a command to this mobile to advance its transmit timing by a small increment. Conversely, if the received signal timing of a mobile leads the nominal timing, a command to retard by a small increment is transmitted to the mobile. The timing adjustment increments are made on the order of ⅛ PN chip or 101.7 nanoseconds. The commands are transmitted at a relatively low rate, on the order of 10 to 50 Hz and consist of a single bit inserted into the digital voice data flow.

During a soft handoff operation, the mobile unit will be receiving signals from two or more cells. Because the mobile unit can only align its timing in response to one of cells' timing adjust commands, the mobile unit will normally move its timing in response to the commands received from the strongest cell being received. The mobile unit transmitted signal will thus be in time alignment with the cell with which it has the best path. Otherwise greater mutual interference to other users will result.

If each cell receiver receiving a mobile signal performs the above time error measurement and correction transmission operation, then all the mobiles' received signals will normally be received with approximately the same timing, resulting in reduced interference.

Figure 9:
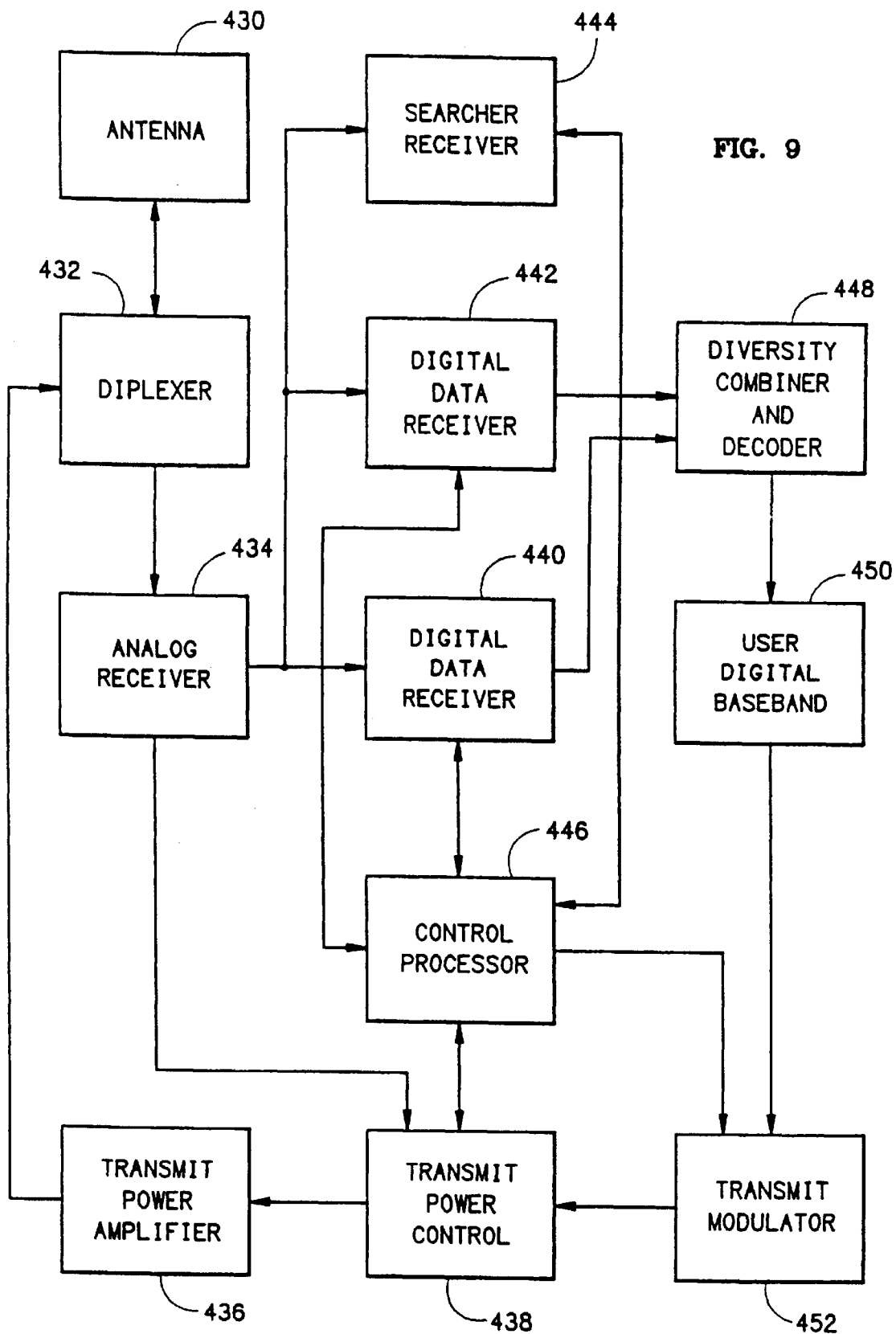
FIG. 9 is a block diagram of the mobile unit telephone configured for CDMA communications in the CDMA cellular telephone system.

FIG. 9 illustrates in block diagram form an exemplary mobile unit CDMA telephone set. The mobile unit CDMA telephone set includes an antenna 430 which is coupled through diplexer 432 to analog receiver 344 and transmit power amplifier 436. Antenna 430 and diplexer 432 are of standard design and permit simultaneous transmission and reception through a single antenna. Antenna 430 collects transmitted signals and provides them through diplexer 432 to analog receiver 434. Receiver 434 receives the RF frequency signals from diplexer 432 which are typically in the 850 MHz frequency band for amplification and frequency downconversion to an IF frequency. This translation process is accomplished using a frequency synthesizer of standard design which permits the receiver to be tuned to any of the frequencies within the receive frequency band of the overall cellular telephone frequency band. The signals are also filtered and digitized for providing to digital data receivers 540 and 542 along with searcher receiver 544.

Figure 10:
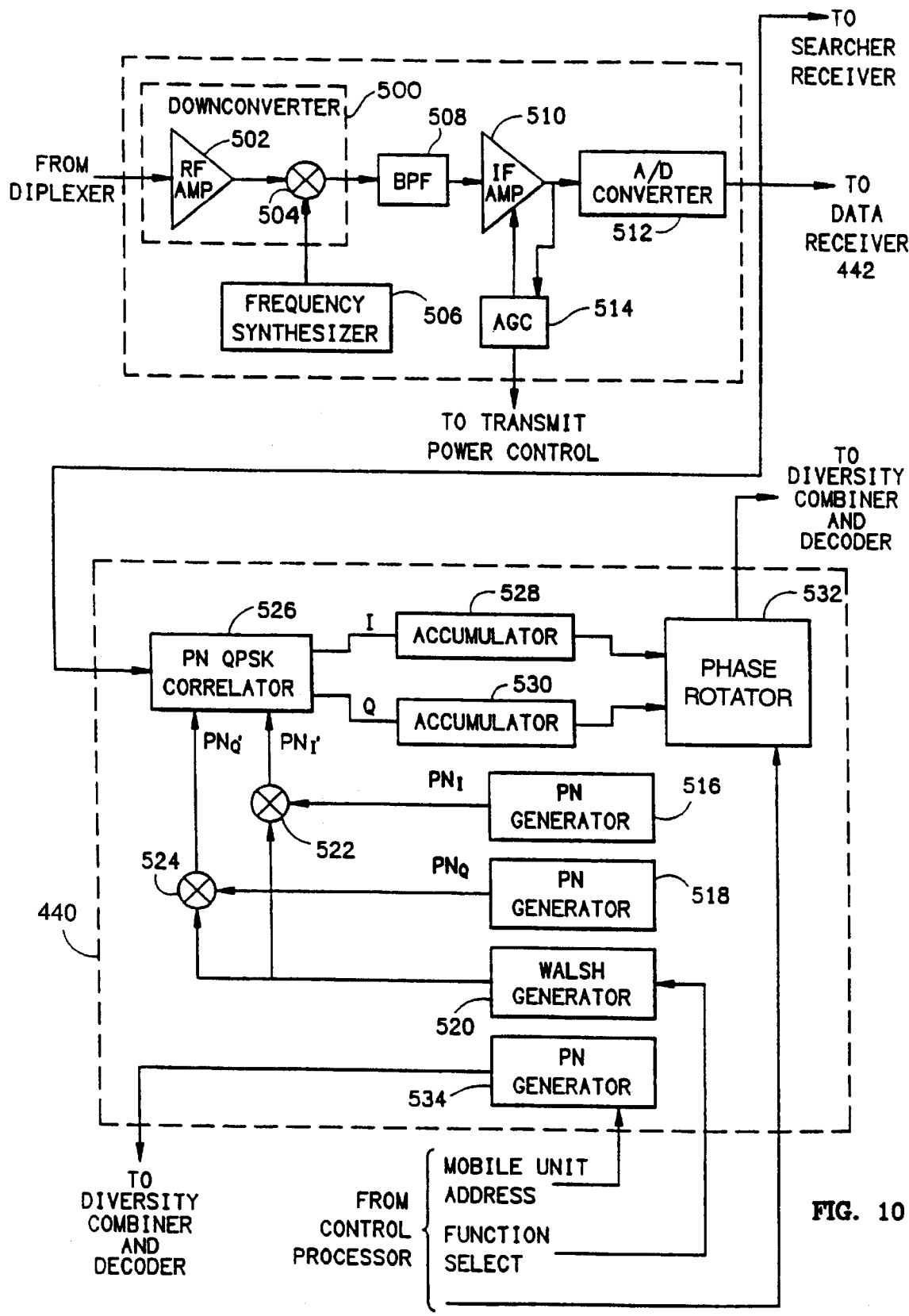
FIG. 10 is a block diagram of the mobile unit receiver.

The details of receiver 434 are further illustrated in FIG. 10. Received signals from antenna 430 are provided to downconverter 500 which is comprised of RF amplifier 502 and mixer 504. The received signals are provided as an input to RF amplifier 502 where they are amplified and output as an input to mixer 504. Mixer 504 is provided with another input, that being the signal output from frequency synthesizer 506. The amplified RF signals are translated in mixer 504 to an IF frequency by mixing with the frequency synthesizer output signal.

The IF signals are output from mixer 504 to bandpass filter (BPF) 508, typically a Surface Acoustic Wave (SAW) filter having a passband of approximately 1.25 MHz, where they are from bandpass filtered. The characteristics of the SAW filter are chosen to match the waveform of the signal transmitted by the cell-site. The cell-site transmitted signal is a direct sequence spread spectrum signal that is modulated by a PN sequence clocked at a predetermined rate, which in the exemplary embodiment is 1.2288 MHz. This clock rate is chosen to be an integer multiple of the baseband data rate of 9.6 kbps.

The filtered signals are output from BPF 508 as an input to a variable gain IF amplifier 510 where the signals are again amplified. The amplified IF signals are output from IF amplifier 510 to analog to digital (A/D) converter 512 where the signals are digitized. The conversion of the IF signal to a digital signal occurs at a 9.8304 MHz clock rate in the exemplary embodiment which is exactly eight times the PN chip rate. Although A/D converter 512 is illustrated as part of receiver 534, it could instead be a part of the data and searcher receivers. The digitized IF signals are output from A/D converter 512 to data receivers 440 and 442, and searcher receiver 444.

Receiver 434 also performs a power control function for adjusting the transmit power of the mobile unit. An automatic gain control (AGC) circuit 514 is also coupled to the output of IF amplifier 510. In response to the level of the amplified IF signal, AGC circuit 514 provides a feedback signal to the gain control input of IF amplifier 510. Receiver 434 also uses AGC circuit 514 to generate an analog power control signal that is provided to transmit power control circuitry 438.

In FIG. 9, the digitized signal output from receiver 434 is provided to digital data receivers 440 and 442 and to searcher receiver 444. It should be understood that an inexpensive, low performance mobile unit might have only a single data receiver while higher performance units may have two or more to allow diversity reception.

The digitized IF signal may contain the signals of many on-going calls together with the pilot carriers transmitted by the current cell-site and all neighboring cell-sites. The function of the receivers 440 and 442 are to correlate the IF samples with the proper PN sequence. This correlation process provides a property that is well-known in the art as "processing gain" which enhances the signal-to-interference ratio of a signal matching the proper PN sequence while not enhancing other signals. Correlation output is then synchronously detected using the pilot carrier from the closest cell-site as a carrier phase reference. The result of this detection process is a sequence of encoded data symbols.

A property of the PN sequence as used in the present invention is that discrimination is provided against multipath signals. When the signal arrives at the mobile receiver after passing through more than one path, there will be a difference in the reception time of the signal. This reception time difference corresponds to the difference in distance divided by the velocity of propagation. If this time difference exceeds one microsecond, then the correlation process will discriminate between the paths. The receiver can choose whether to track and receive the earlier or later path. If two receivers are provided, such as receivers 440 and 442, then two independent paths can be tracked and processed in parallel.

Searcher receiver 444, under control of control processor 446 is for continuously scanning the time domain around the nominal time of a received pilot signal of the cell-site for other multi-path pilot signals from the same cell-site and for other cell-site transmitted pilot signals. Receiver 444 will measure the strength of any reception of a desired waveform at times other than the nominal time. Receiver 444 compares signal strength in the received signals. Receiver 444 provides a signal strength signal to control processor 446 indicative of the strongest signals.

Processor 446 provides control signals to data receivers 440 and 442 for each to process a different one of the strongest signals. On occasion another cell-site transmitted pilot signal is of greater signal strength than the current cell-site signal strength. Control processor 446 then would generate a control message for transmission to the system controller via the current cell-site requesting a transfer of the cell to the cell-site corresponding to the strongest pilot signal. Receivers 440 and 442 may therefore handle calls through two different cell-sites.

During a soft handoff operation, the mobile unit will be receiving signals from two or more cells. Because the mobile unit can only align its timing in response to one of cells' timing adjust commands, the mobile unit will normally move its timing in response to the commands received from the strongest cell being received. The mobile unit transmitted signal will thus be in time alignment with the cell with which it has the best path. Otherwise greater mutual interference to other users will result.

Further details of an exemplary receiver, such as data receiver 440 is illustrated in further detail in FIG. 10. Data receiver 440 includes PN generators 516 and 518 which generate the $PN_I$ and $PN_Q$ sequences in a manner and corresponding to those generated by the cell-site. Timing and sequence control signals are provided to PN generators 516 and 518 from control processor 446. Data receiver 440 also includes Walsh generator 520 which provides the appropriate Walsh function for communication with this mobile unit by the cell-site. Walsh generator 520 generates, in response to timing signals (not shown) and a function select signal from the control processor, a signal corresponding to an assigned Walsh sequence. The function select signal is transmitted to the mobile unit by the cell-site as part of the call set up message. The $PN_I$ and $PN_Q$ sequences output from PN generators 516 and 518 are respectively input to exclusive-OR gates 522 and 524. Walsh generator 520 provides its output to both of exclusive-OR gates 522 and 524 where the signals are exclusive-OR'ed and output the sequences $PN_I'$ and $PN_Q'$.

The sequences $PN_I'$ and $PN_Q'$ are provided to receiver 440 where they are input to PN QPSK correlator 526. PN correlator 526 may be constructed in a manner similar to the PN correlator of the cell-site digital receivers. PN correlator 526 correlates the received I and Q channel data with the $PN_I'$ and $PN_Q'$ sequences and provides correlated I and Q channel data output to corresponding accumulators 528 and 530. Accumulators 528 and 530 accumulate the input information over a period of one symbol or 64 chips. The accumulator outputs are provided to phase rotator 532 which also receives a pilot phase signal from control processor 446. The phase of the received symbol data is rotated in accordance with the phase of the pilot signal as determined by the searcher receiver and the control processor. The output from phase rotator 532 is the I channel data which is provided to the deinterleaver and decoder circuitry.

Control processor 446 also includes PN generator 534 which generates the user PN sequence in response to an input mobile unit address or user ID. The PN sequence output from PN generator 534 is provided to diversity combiner and decoder circuitry. Since the cell-to-mobile signal is scrambled with the mobile user address PN sequence, the output from PN generator 534 is used in descrambling the cell-site transmitted signal intended for this mobile user similar to that as in the cell-site receiver. PN generator 534 specifically provides the output PN sequence to the deinterleaver and decoder circuitry where it is used to descramble the scrambled user data. Although scrambling is discussed with reference to a PN sequence, it is envisioned that other scrambling techniques including those well known in the art may be utilized.

The outputs of receivers 440 and 442 are thus provided to diversity combiner and decoder circuitry 448. The diversity combiner circuitry contained within circuitry 448 simply adjusts the timing of the two streams of received symbols into alignment and adds them together. This addition process may be proceeded by multiplying the two streams by a number corresponding to the relative signal strengths of the two streams. This operation can be considered a maximal ratio diversity combiner. The resulting combined signal stream is then decoded using a forward error detection (FEC) decoder also contained within circuitry 448. The usual digital baseband equipment is a digital vocoder system. The CDMA system is designed to accommodate a variety of different vocoder designs.

Baseband circuitry 450 typically includes a digital vocoder (not shown) which may be a variable rate type as disclosed in the previously mentioned copending patent application. Baseband circuitry 450 further serves as an interface with a handset or any other type of peripheral device. Baseband circuitry 450 accommodates a variety of different vocoder designs. Baseband circuitry 450 provides output information signals to the user in accordance with the information provided thereto from circuitry 448.

In the mobile-to-cell link, user analog voice signals are typically provided through a handset as an input to baseband circuitry 450. Baseband circuitry 450 includes an analog to digital (A/D) converter (not shown) which converts the analog signal to digital form. The digital signal is provided to the digital vocoder where it is encoded. The vocoder output is provided to a forward error correction (FEC) encoding circuit (not shown) for error correction. In the exemplary embodiment the error correction encoding implemented is of a convolutional encoding scheme. The digitized encoded signal is output from baseband circuitry 450 to transmit modulator 452.

Transmit modulator 452 first Walsh encodes the transmit data and then modulates the encoded signal on a PN carrier signal whose PN sequence is chosen according to the assigned address function for the call. The PN sequence is determined by control processor 446 from call setup information that is transmitted by the cell-site and decoded by receivers 440 and 442 and control processor 446. In the alternative, control processor 446 may determine the PN sequence through prearrangement with the cell-site. Control processor 446 provides the PN sequence information to transmit modulator 452 and to receivers 440 and 442 for call decoding.

The output of transmit modulator 452 is provided to transmit power control circuitry 438. Signal transmission power is controlled by the analog power control signal provided from receiver 434. Control bits transmitted by the cell-sites in the form of power adjustment commands are processed by data receivers 440 and 442. The power adjustment commands are used by control processor 446 in setting the power level in mobile unit transmission. In response to these commands, control processor 446 generates a digital power control signal that is provided to circuitry 438. Further information on the relationship of receivers 440 and 442, control processor 446 and transmit power control 438 with respect to power control is further described in the above-mentioned U.S. Pat. No. 5,056,109.

Transmit power control circuitry 438 outputs the power controlled modulated signal to transmit power amplifier circuitry 436. Circuitry 436 amplifies and converts the IF signal to an RF frequency by mixing with a frequency synthesizer output signal which tunes the signal to the proper output frequency. Circuitry 436 includes an amplifier which amplifies the power to a final output level. The intended transmission signal is output from circuitry 436 to diplexer 432. Diplexer 432 couples the signal to antenna 340 for transmission to the cell-sites.

Control processor 446 also is capable of generating control messages such as cell-diversity mode requests and cell-site communication termination commands. These commands are provided to transmit modulator 452 for transmission. Control processor 446 is responsive to the data received from data receivers 440 and 442, and search receiver 444 for making decisions relative to handoff and diversity combining.

With respect to transmission by the mobile unit, the mobile user analog voice signal is first passed through a digital vocoder. The vocoder output is then, in sequence, convolutional forward error correction (FEC) encoded, 64-ary orthogonal sequence encoded and modulated on a PN carrier signal. The 64-ary orthogonal sequence is generated by a Walsh function encoder. The encoder is controlled by collecting six successive binary symbol outputs from the convolutional FEC encoder. The six binary collectively determine which of the 64 possible Walsh sequences will be transmitted. The Walsh sequence is 64 bits long. Thus, the Walsh "chip" rate must be 9600*3*(1/6)*64=307200 Hz for a 9600 bps data transmission rate.

In the mobile-to-cell link, a common short PN sequence is used for all voice carriers in the system, while user address encoding is done using the user PN sequence generator. The user PN sequence is uniquely assigned to the mobile for at least the duration of the call. The user PN sequence is exclusive-OR'ed with the common PN sequences, which are length 32768 augmented maximal-length linear shift register sequences. The resulting binary signals then each bi-phase modulate a quadrature carrier, are summed to form a composite signal, are bandpass filtered, and translated to an IF frequency output. In the exemplary embodiment, a portion of the filtering process is actually carried out by a finite impulse response (FIR) digital filter operating on the binary sequence output.

The modulator output is then power controlled by signals from the digital control processor and the analog receiver, converted to the RF frequency of operation by mixing with a frequency synthesizer which tunes the signal to proper output frequency, and then amplified to the final output level. The transmit signal is then passed on to the diplexer and the antenna.

Figure 11:
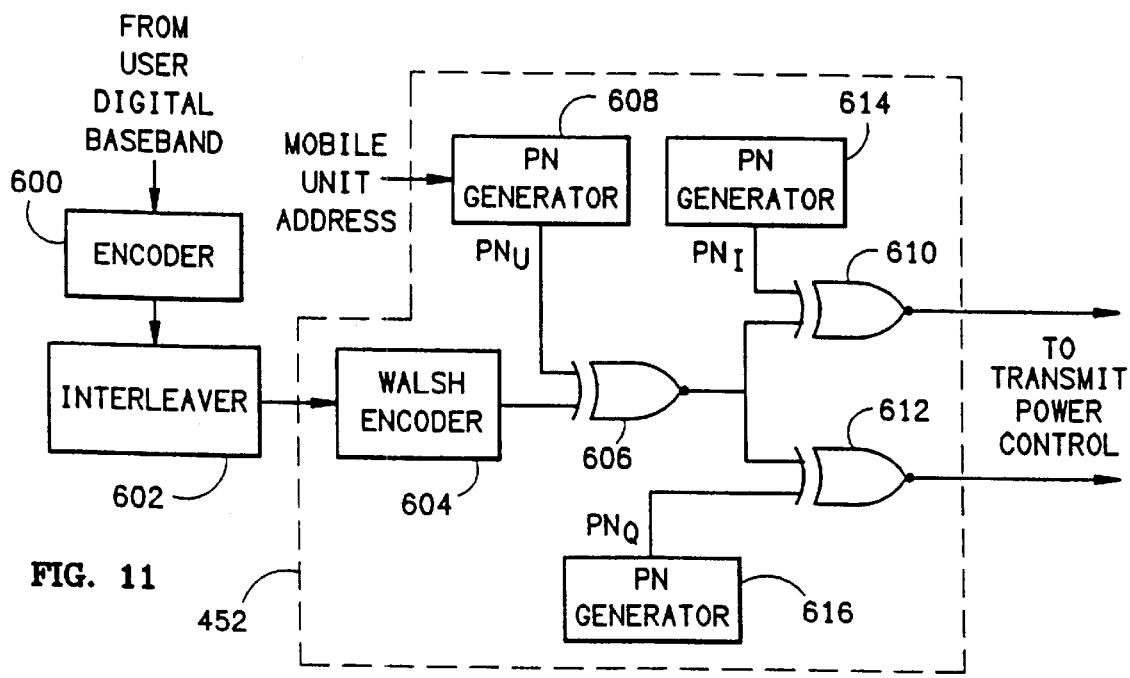
FIG. 11 is a block diagram of the mobile unit transmit modulator.

FIG. 11 illustrates a preferred, but yet exemplary, embodiment of mobile unit transmit modulator 452. Data is provided in digital form from the user digital baseband circuitry to encoder 600 where in the exemplary embodiment is convolutionally encoded. The output of encoder 600 is provided to interleaver 602 which in the exemplary embodiment is a block interleaver. The interleaved symbols are output from block interleaver 602 to Walsh encoder 604 of transmit modulator 452. Walsh encoder 604 utilizes the input symbols to generate a code sequence output. The Walsh sequence is provided to one input of exclusive-OR gate 606.

Transmit modulator 452 further includes PN generator 608 which receives the mobile unit address as an input in determining the output PN sequence. PN generator 608 generates the user specific 42-bit sequence as was discussed with reference to FIG. 3 and 4a–4c. A further attribute of PN generator 608 that is common to all user PN generators and not previously discussed is the use of a masking technique in generating the output user PN sequence. For example, a 42-bit mask is provided for that user with each bit of the 42-bit mask exclusive-OR'ed with a bit output from each register of the series of shift register that form the PN generator. The results of the mask and shift register bit exclusive-OR operation are then exclusive-OR'ed together to form the PN generator output that is used as the user PN sequence. The output PN sequence of PN generator 608, the sequence $PN_U$, is input to exclusive-OR gate 606. The Walsh symbol data and the $PN_U$ sequence are exclusive-OR'ed in exclusive-OR gate 606 and provided as in input to both of exclusive-OR gates 610 and 612.

Transmit modulator 452 further includes PN generators 614 and 616 which respectively generate $PN_I$ and $PN_Q$ sequences. All mobile units use the same $PN_I$ and $PN_Q$ sequences. These PN sequences are in the exemplary embodiment the zero-shift used in the cell-to-mobile communications. The other input of exclusive-OR gates 610 and 612 are respectively provided with the $PN_I$ and $PN_Q$ sequences output from PN generators 614 and 616. The sequences $PN_I$ and $PN_Q$ are exclusive-OR'ed in the respective exclusive-OR gates with the output provided to transmit power control 438 (FIG. 9).

In the exemplary embodiment, the mobile-to-cell link uses rate $r=1/3$ convolutional code with constraint length $K=9$. The generators for the code are $G_1=557$ (octal), $G_2=663$ (octal), and $G_3=711$ (octal). Similar to the cell-to-mobile link, code repetition is used to accommodate the four different data rates that the vocoder produces on a 20 msec frame basis. Unlike the cell-to-mobile link, the repeated code symbols are not transmitted over the air at lower energy levels, rather only one code symbol of a repetition group is transmitted at the nominal power level. In conclusion, the code repetition in the exemplary embodiment is used merely as an expedient to fit the variable data rate scheme in the interleaving and modulation structure as it will be shown in the following paragraphs.

A block interleaver spanning 20 msec, exactly one vocoder frame, is used in the mobile-to-cell link. The number of code symbols in 20 msec, assuming a data rate of 9600 bps and a code rate r=⅓, is 576. The N and B parameters, N is equal to the number of rows and B to the number of columns of the interleaver array are 32 and 18, respectively. The code symbols are written into the interleaver memory array by rows and read out by columns.

The modulation format is 64-ary orthogonal signaling. In other words, interleaved code symbols are grouped into groups of six to select one out of 64 orthogonal waveforms. The 64 time orthogonal waveforms are the same Walsh functions used as cover sequences in the cell-to-mobile link.

The data modulation time interval is equal to 208.33 $\mu$sec, and is referred to as a Walsh symbol interval. At 9600 bps, 208.33 $\mu$sec corresponds to 2 information bits and equivalently to 6 code symbols at a code symbol rate equal to 28800 sps. The Walsh symbol interval is subdivided into 64 equal length time intervals, referred to as Walsh chips, each lasting 208.33/64=3.25 $\mu$sec. The Walsh chip rate is then 1/3.25 $\mu$sec=307.2 kHz. Since the PN spreading rate is symmetric in the two links, i.e. 1.2288 MHz, there are exactly 4 PN chips per Walsh chip.

A total of three PN generators are used in the mobile-to-cell link path. The user specific 42-bit PN generator and the pair of 15-bit I and Q channel PN generators. Following the user specific spreading operation, the signal is QPSK spread as it was done in the cell-to-mobile link. Unlike the cell-to-mobile link, where each sector or cell was identified by unique sequences of length $2^{15}$, here all mobile units use the same I and Q PN sequences. These PN sequences are the zero-shift sequences used in the cell-to-mobile link, also referred to as the pilot sequences.

Code repetition and energy scaling are used in the cell-to-mobile link to accommodate the variable rates produced by the vocoder. The mobile-to-cell link uses a different scheme based on a burst transmission.

The vocoder produces four different data rates, i.e. 9600, 4800, 2400, and 1200 bps, on a 20 msec frame basis as in the cell-to-mobile link. The information bits are encoded by the rate r=⅓ convolutional encoder and code symbols are repeated 2, 4, and 8 times at the three lower data rates. Thus, the code symbol rate is kept constant at 28800 sps. Following the encoder, the code symbols are interleaved by the block interleaver which spans exactly one vocoder frame or 20 msec. A total of 576 code symbols are generated every 20 msec by the convolutional encoder, some of which might be repeated symbols.

Figure 12:
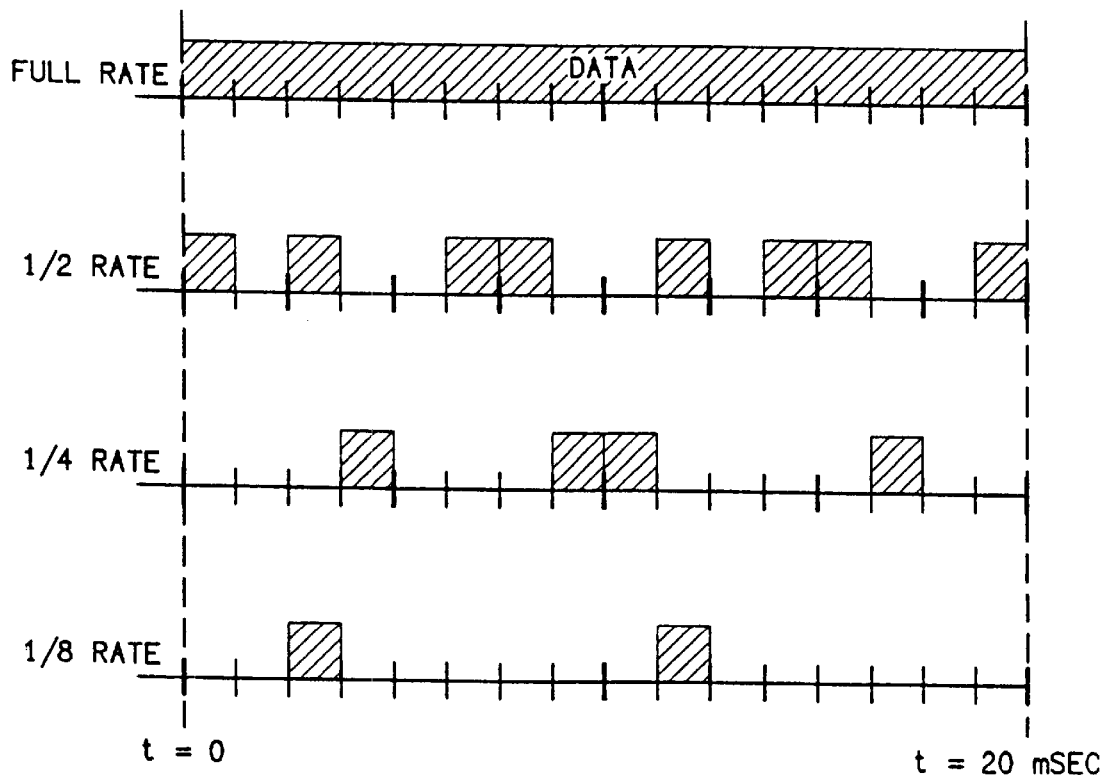
FIG. 12 is an exemplary timing diagram of the mobile-to-cell link for the variable data rate with burst transmission.

The code symbols sequence as it is transmitted is shown in FIG. 12. Notice that a vocoder frame, 20 msec, has been subdivided into 16 slots each lasting 1.25 msec. The numerology of the mobile-to-cell link is such that in each slot there are 36 code symbols at the 28800 sps rate or equivalently 6 Walsh symbols at the 4800 sps rate. At the ½ rate, i.e. 4800 bps, the slots are grouped into 8 groups each comprising 2 slots. At the ¼ rate, i.e. 2400 bps, the slots are grouped into 4 groups each comprising 4 slots, and finally at the ⅛ rate, i.e. 1200 bps, the slots are grouped into 2 groups each comprising 8 slots.

An exemplary symbol burst transmission pattern is further illustrated in FIG. 12. For example, at the ¼ rate, i.e. 2400 bps, during the fourth slot of the first group the fourth and eighth row of the interleaver memory array are read out by columns and sequentially transmitted. The slot position for the transmitted data must be randomized in order to reduce the interference.

Figure 13:
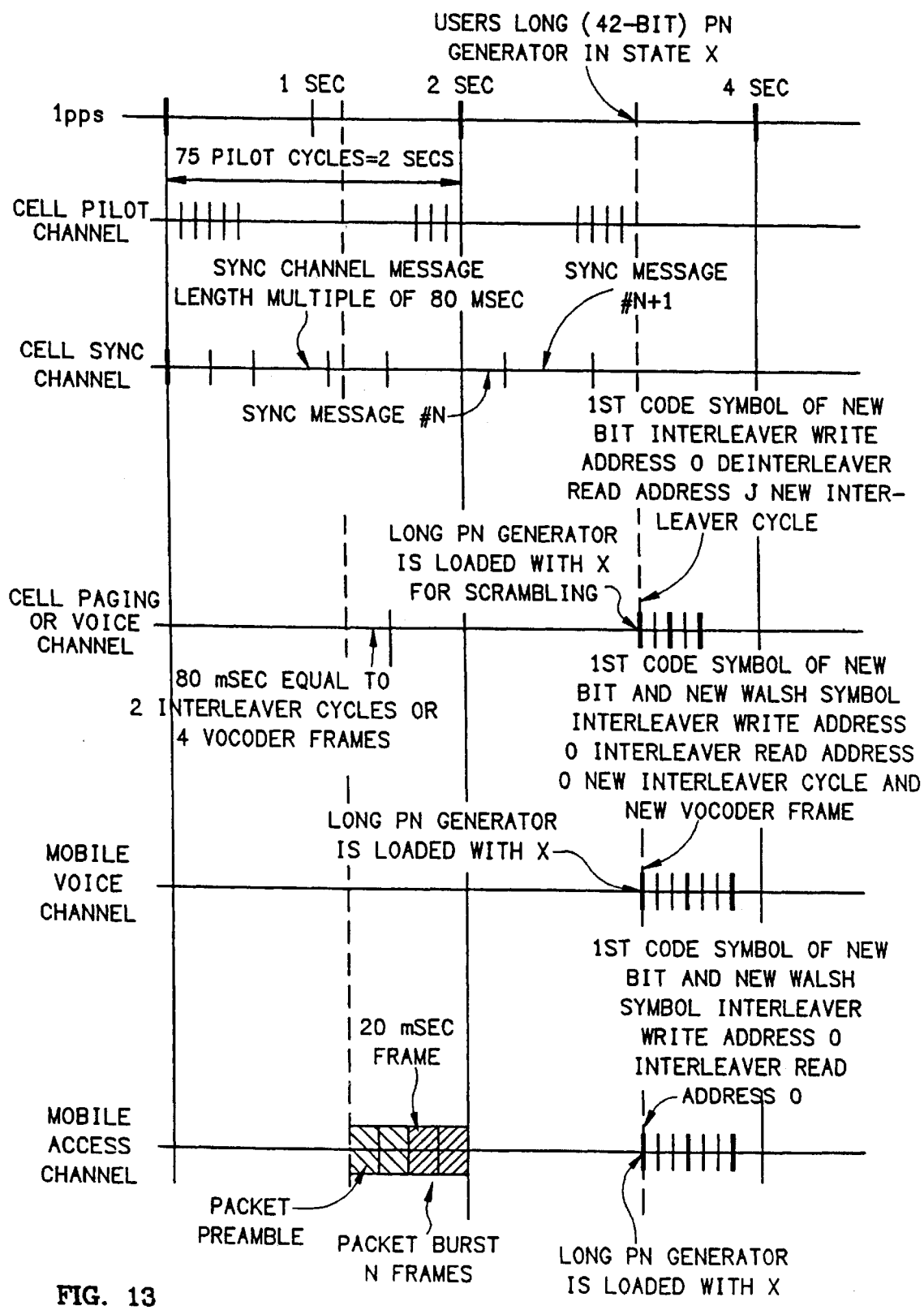
FIG. 13 is an exemplary timing diagram of the overall mobile-to-cell link timing.

The mobile-to-cell link timing is illustrated in FIG. 13. FIG. 13 expands upon the timing diagram of FIG. 7 to include the mobile-to-cell channels, i.e. voice and access. The synchronization of the mobile-to-cell link comprises the following steps:

1. Decode successfully a sync message, i.e. CRC check;
2. Load long PN shift register with state received in the sync message; and
3. Compensate for pilot code phase offset if receiving from a sector which uses a shifted pilot.

At this point the mobile has complete synchronization, i.e. PN synchronization and real time synchronization, and can begin to transmit on either the access channel or voice channel.

The mobile unit in order to originate a call must be provided with signaling attributes in order to complete a call to another system user via a cell-site. In the mobile-to-cell link the envisioned access technique is the slotted ALOHA. An exemplary transmission bit rate on the reverse channel is 4800 bps. An access channel packet comprises of a preamble followed by the information.

The preamble length is in the exemplary embodiment an integer multiple of 20 msec frames and is a sector/cell parameter which the mobile receives in one of the paging channel messages. Since the cell receivers use the preambles to resolve propagation delays this scheme allows the preamble length to vary based on the cell radius. The users PN code for the access channel is either prearranged or transmitted to the mobile units on the paging channel.

The modulation is fixed and constant for the duration of the preamble. The orthogonal waveform used in the preamble is $W_0$, i.e. the all zero Walsh function. Notice that an all zero pattern at the input of the convolutional encoder generates the desired waveform $W_0$.

An access channel data packet may consist of one or at most two 20 msec frames. The coding, interleaving, and modulation of the access channel is exactly the same as for a voice channel at the 9600 bps rate. In an exemplary embodiment, the sector/cell requires the mobile units to transmit a 40 msec preamble and the access channel message type requires one data frame. Let Np be the number of preamble frames where k is the number of 20 msec elapsed from a predefined time origin. Then mobiles are allowed to initiate transmission on the access channel only when the equation: (k, Np+2)=0 is true.

With respect to other communications applications it may be desirable to rearrange the various elements of the error correction coding, the orthogonal sequence coding and the PN coding to better fit the application.

For example, in satellite mobile communications where the signals are relayed between large Hub earth stations and the mobile terminals by one or more earth orbiting satellites, it may be desirable to employ coherent modulation and demodulation techniques in both directions of the link because the channel is much more phase coherent than the terrestrial mobile channel. In such an application, the mobile modulator would not utilize m-ary encoding as described above. Instead, bi-phase or four-phase modulation of forward error correction symbols might be employed with conventional coherent demodulation with carrier phase extracted from the received signal using Costas loop techniques. In addition, the orthogonal Walsh function channelization such as herein described for the cell-to-mobile link may be employed. As long as the channel phase remains reasonably coherent, this modulation and demodulation system provides operation with lower Eb/No than m-ary orthogonal signaling resulting in higher system capacity.

In another embodiment, it may be preferable to encode the speech waveform directly into the RF waveform instead of utilizing a vocoder and FEC techniques. While the use of a vocoder and FEC techniques result in very high link performance, the complexity of implementation is high, resulting in additional cost and in high power consumption. These disadvantages may be especially unfavorable in a pocket portable telephone where battery consumption and cost are important. In customary digital telephone transmission practice, the speech waveform is represented in a digital format as 8 bit speech samples at a sample rate of 8 kHz. The CDMA system could encode the 8 bit samples directly into carrier phase angles. This would eliminate the need for a vocoder or a FEC encoder/decoder. It would also require a somewhat higher signal-to-noise ratio for good performance, resulting in lower capacity. In another alternative, the 8 bit speech samples could be directly encoded into carrier amplitudes. In yet another alternative, the speech waveform samples could be encoded into carrier phases and amplitudes.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. An apparatus for transmitting a plurality of data signals in a spread spectrum communication system, comprising:
   a plurality of signal generator means for providing a plurality of function signals, each function signal being generated according to a respective function of a plurality of orthogonal functions, wherein the plurality of signal generator means comprises:
   an outer signal generator for generating an outer function signal;
   multiple inner signal generators for generating a plurality of inner function signals each inner function signal being generated according to a respective function of said plurality of orthogonal functions;
   a plurality of spreading means, each spreading means connected to a respective signal generator means and receiving a respective data signal of the plurality of data signals for producing a respective spread spectrum data signal in response to the respective data signal and a respective function signal, wherein each spreading means includes two exclusive-OR gates:
      a first exclusive-OR gate having two inputs and one output, a first input connected to a respective inner signal generator and a second input receiving a respective data signal of the plurality of data signals; and
      a second exclusive-OR gate having two inputs and an output, a first input connected to the outer signal generator, a second input connected to the output of the first exclusive-OR gate, and the output connected to a combining means;
   a pilot signal generator means for generating a pilot signal according to a function which is orthogonal to each function of the plurality of orthogonal functions;
   said combining means being connected to the plurality of spreading means, wherein said combining means combines a plurality of spread spectrum data signals into a combined spread spectrum data signal; and
   a transmit means connected to the combining means for amplifying and transmitting the combined spread spectrum data signal.

2. An apparatus for transmitting a plurality of data signals in a spread spectrum communication system, comprising:
   a plurality of signal generator means for providing a plurality of function signals, each function signal being generated according to a respective function of a plurality of orthogonal functions, wherein the plurality of signal generator means comprises:
   first and second outer signal generators for generating first and second outer function signals representing, respectively, first and second outer functions, the first outer function being substantially orthogonal to the second outer function;
   multiple inner signal generators for generating a plurality of inner function signals, each inner function signal being generated according to a respective function of said plurality of orthogonal functions; and
   a plurality of spreading means, each spreading means connected to a respective signal generator means and receiving a respective data signal of the plurality of data signals for producing a respective spread spectrum data signal in response to the respective data signal and a respective function signal; wherein each spreading means includes three exclusive-OR gates:
      a first exclusive-OR gate having two inputs and one output, a first input connected to a respective inner signal generator and the second input receiving a respective data signal of the plurality of data signals;
      a second exclusive-OR gate having two inputs and an output, a first input connected to the first outer signal generator, a second input connected to the output of the first exclusive-OR gate, and the output connected to a combining means; and
      a third exclusive-OR gate having two inputs and an output, the first input connected to the second outer signal generator, the second input connected to the output of the first exclusive-OR gate, and the output connected to the combining means;
   said combining means being connected to the plurality of spreading means, wherein said combining means combines a plurality of spread spectrum data signals into a combined spread spectrum data signal; and
   a transmit means connected to the combining means for amplifying and transmitting the combined spread spectrum data signal.

3. The apparatus of claim 2, wherein the multiple inner signal generators comprise multiple code signal generators, each code signal generator for generating a binary sequence code which is orthogonal to a binary sequence code generated by at least one other code signal generator of the multiple code signal generators.

4. The apparatus of claim 3, wherein:
   the pilot signal generator means comprise a first code signal generator for generating a first binary sequence code; and
   the plurality of signal generator means comprises multiple second code signal generators, each second code signal generator for generating a respective second binary sequence code which is orthogonal to the first binary sequence code and to all of the other second respective binary sequence codes.

5. An apparatus for spread spectrum transmission of a plurality of data signals, comprising:
a plurality of signal generator means for providing a plurality of function signals, each function signal being provided according to a respective function of a plurality of orthogonal functions;
a plurality of spreading means, each spreading means connected to a respective signal generator means and connected to receive a respective data signal of the plurality of data signals for spread spectrum generation of a respective spread spectrum data signal;
means connected to the plurality of spreading means for combining a plurality of spread spectrum data signals to generate a combined spread spectrum data signal including the plurality of spread spectrum data signals;
transmit means for amplifying and transmitting the combined spread spectrum data signal; and
outer coding means for generating an outer code signal, and wherein each spreading means of the plurality of spreading means is further connected to the outer coding means for combining the outer code signal with a respective data signal and a respective function signal to produce a respective outer-coded spread spectrum data signal, and the means for combining is for generating the combined spread spectrum data signal including a plurality of outer coded spread spectrum data signals.

6. The apparatus of claim 5, further including:
a pilot signal generator means for generating a pilot signal according to a pilot function which is orthogonal to each function of the plurality of orthogonal functions; and
the means for combining including means connected to the pilot signal generator means and to the outer coding means for combining the outer code signal with the pilot signal to produce an outer-coded spread spectrum pilot signal, the means for combining further for generating the combined spread spectrum data signal including the plurality of outer-coded spread spectrum data signals and the outer-coded spread spectrum pilot signal.

7. The apparatus of claim 5, each spreading means of the plurality of spreading means including:
a first exclusive-OR gate having two inputs and one output, a first input connected to a respective signal generator means of the plurality of signal generator means and a second input receiving respective data signal of the plurality of data signals; and
a second exclusive-OR gate having two inputs and an output, a first input connected to the outer coding means, a second input connected to the output of the first exclusive-OR gate, and the output connected to the combining means.

8. The apparatus of claim 7, wherein:
a first data signal of the plurality of data signals includes spread spectrum communications control information;
a second data signal of the plurality of data signals includes spread spectrum communications receiver paging information; and
one or more third data signals include voice information.

9. A method for transmitting a plurality of data signals in a spread spectrum communication system, comprising the steps of:
generating a plurality of function signals, each function signal being generated according to a respective function of a plurality of orthogonal functions;
producing a plurality of spread spectrum data signals, each spread spectrum data signal of the plurality of spread spectrum data signals being produced by exclusive-OR combination of a respective function signal and a respective data signal of the plurality of data signals;
combining the plurality of spread spectrum data signals into a combined spread spectrum data signal;
amplifying and transmitting the combined spread spectrum data signal;
generating an outer function signal; and
wherein the combining step includes:
producing a plurality of first spread spectrum signals, each first spread spectrum signal being produced by exclusive-OR combination of a respective function signal of the plurality of function signals with a respective data signal of the plurality of data signals; and
producing a plurality of second spread spectrum signals, each second spread spectrum signal produced by exclusive-OR combination of a first spread spectrum signal with the outer function signal.

10. The method of claim 9, further including:
generating first and second outer function signals according to, respectively, first and second outer spreading functions, the first outer function being substantially orthogonal to the second outer function; and
the combining step including:
generating a plurality of first spread signals, each first spread signal produced by exclusive-OR combination of respective function signal of the plurality of function signals and a respective data signal of the plurality of data signals;
producing a plurality of second spread signals, each second spread signal produced by exclusive-OR combination of a respective first spread signal and the first outer function signal; and
producing a plurality of third spread signals, each third spread signal produced by exclusive-OR combination of a respective first spread signal and the second outer function signal; and
the plurality of spread spectrum data signals including the plurality of second spread signals and third spread signals.

11. The method of claim 9, wherein each function signal of the plurality of function signals includes a binary sequence code which is orthogonal to a binary sequence code included in at least one other function signal.

12. A method for spread spectrum transmission of a plurality of data signals, comprising the steps of:
generating a plurality of function signals, each function signal being generated according to a respective function of a plurality of orthogonal functions;
generating a plurality of spread spectrum data signals, each spread spectrum data signal produced by combining a respective data signal of the plurality of data signals with a respective function signal of the plurality of orthogonal function signals;
producing a combined spread spectrum data signal by summation of the plurality of spread spectrum data signals;
amplifying and transmitting the combined spread spectrum data signal; and
generating an outer code signal;
the step of generating the plurality of spread spectrum signals including combining the outer code signal with a respective data signal of the plurality of data signals and a respective function signal of the plurality of function signals to produce a respective outer coded spread spectrum data signal; and the step of producing a combined spread spectrum data signal including summation of a plurality of outer coded spread spectrum data signals.

13. The method of claim 12, further including:

generating a pilot function signal according to a pilot function which is orthogonal to each function of the plurality of orthogonal functions; and the step of producing a combined spread spectrum data signal including combining the outer code signal with the pilot function signal to produce an outer-coded spread spectrum pilot signal and summation of the outer-coded spread spectrum pilot signal with the plurality of outer-coded spread spectrum data signals.

14. A communication modulation system, comprising:

pilot signal generator means for generating a pilot signal according to a first orthogonal function selected from a set of orthogonal functions;

communication signal generator means for receiving an input data signal, generating an orthogonal function signal according to a second orthogonal function selected from said set of orthogonal functions, wherein said second orthogonal function is different from said first orthogonal function, combining said orthogonal function signal with said input data signal and providing a resultant spread spectrum data signal; and outer coding means for receiving said pilot signal and said spread spectrum data signal, generating a pseudorandom noise (PN) signal of a predetermined PN code, combining said PN signal with said pilot signal and said spread spectrum data signal to produce corresponding PN-spread pilot and spread spectrum data signals.

15. The communication modulation system of claim 14, wherein:

said communication signal generator means is further for receiving at least one additional input data signal, generating for each additional input data signal an additional orthogonal function signal, each according to an additional orthogonal function selected from said set of orthogonal functions wherein each additional orthogonal function is different from said first and second orthogonal functions and each other additional orthogonal function, combining each additional orthogonal function signal with a respective one of said additional input data signals and providing corresponding resultant additional spread spectrum data signals; and said outer coding means is further for receiving each additional spread spectrum data signal, combining said PN signal with each additional spread spectrum data signal so as to produce additional PN spread spectrum signals.

16. The communication modulation system of claim 15, wherein said first, second, and each additional orthogonal function are selected from a set of Walsh functions.

17. The communication modulation system of claim 15, further comprising modulation means for modulating said pilot, spread spectrum, and additional spread spectrum signals upon a carrier signal for transmission.

18. In a direct sequence spread spectrum modulator in which a plurality of channel signals are to be transmitted, a modulation method comprising the steps of:

generating a plurality of orthogonal function signals each being generated according to a respective function of a set of orthogonal functions;

receiving a plurality of input information signals;

producing a plurality of spread channel information signals by modulo-2 addition of each of said information signals with a different one of said orthogonal function signals;

combining the plurality of spread channel information signals into a modulated transmission signal comprising the steps of:

generating a predetermined pseudorandom noise spreading code;

modulating each of the plurality of spread channel information signals by the pseudorandom noise spreading code; and, then combining a plurality of modulated spread channel information signals into said modulated transmission signal; and providing a selected one of said orthogonal function signals as a pilot channel signal for spreading according to the predetermined pseudorandom noise spreading coding;

wherein the step of modulating each of the plurality of spread channel information signals includes:

receiving an input information signal;

combining said information signal with a respective one of said orthogonal function signals; and providing an orthogonalized information signal as a corresponding spread channel information signal for spreading according to said predetermined pseudorandom noise spreading code.

19. In a communication system in which a plurality of remote user stations communicate, via a radio link with a base station, with other user stations, said base station having a base station transceiver for communicating user station information signals to intended recipient remote user stations and for receiving remote user station communicated information signals for transfer to intended recipient user stations, said base station transceiver comprising:

base station transmission means for receiving at least one user station information signal, spreading each received user station information signal according to a respective predetermined orthogonal function, and transmitting said spread user station information signals as a base station communication signal; and base station reception means for receiving and extracting from each remote user station transmitted remote user station communication signal a corresponding remote user station information signal for transfer to intended recipient user stations; wherein each remote user station including a remote user station transceiver for communicating remote user station information signals to said base station for transfer to an intended recipient user station and for receiving and extracting from said base station communication signal respective user station information signals intended for said recipient remote user station, said remote user station transceiver comprising:

remote user station transmission means for receiving a remote user station information signal, converting said remote user station information signal into respective groups of orthogonal function signals, modulating and transmitting said orthogonal function signals as a remote user station communication signal; and remote user station reception means for receiving and extracting from said base station communication signal said user station information signal intended for said remote user station.

20. The communication system of claim 19 wherein said base station reception means comprises first demodulation means for demodulating each received remote user station communication signal, transform processing each demodulated remote user station communication signal, and providing corresponding outputs of remote user station information signals.

21. The communication system of claim 19 wherein said remote user station reception means comprises demodulation means for demodulating said base station communication signals, despreading said demodulated base station communication signal according a predetermined one of said orthogonal functions, and providing a corresponding output of said user station information signal intended for said remote user station.

22. The communication system of claim 20 wherein said remote user station reception means comprises second demodulation means for demodulating said base station communication signal, despreading said demodulated base station communication signal according a predetermined one of said orthogonal functions, and providing a corresponding output of said user station information signal intended for said remote user station.

23. An apparatus for transmitting a plurality of data signals in a spread spectrum communication system, comprising:
  a plurality of signal generators that provide a plurality of function signals, each function signal being generated according to a respective function of a plurality of orthogonal functions, wherein the plurality of signal generators comprise an outer signal generator for generating an outer function signal;
  multiple inner signal generators for generating a plurality of inner function signals, each inner function signal being generated according to a respective function of said plurality of orthogonal functions;
  a plurality of spreaders, each spreader connected to a respective signal generator and receiving a respective data signal of the plurality of data signals for producing a respective spread spectrum data signal in response to the respective data signal and a respective function signal; wherein each spreader includes two exclusive-OR gates:
    a first exclusive-OR gate having two inputs and one output, a first input connected to a respective inner signal generator and a second input receiving a respective data signal of the plurality of data signals; and
    a second exclusive-OR gate having two inputs and an output, a first input connected to the outer signal generator, a second input connected to the output of the first exclusive-OR gate, and the output connected to a signal combiner;
  a pilot signal generator for generating a pilot signal according to a function which is orthogonal to each function of the plurality of orthogonal functions;
  said signal combiner being connected to the plurality of spreaders and combining a plurality of spread spectrum data signals into a combined spread spectrum data signal; and
  a transmitter connected to the signal combiner for amplifying and transmitting the combined spread spectrum data signal.

24. An apparatus for transmitting a plurality of data signals in a spread spectrum communication system, comprising:
  a plurality of signal generators that provide a plurality of function signals, each function signal being generated according to a respective function of a plurality of orthogonal functions, wherein the plurality of signal generators comprise:
    first and second outer signal generators for generating first and second outer function signals representing, respectively, first and second outer functions, the first outer function being substantially orthogonal to the second outer function;
    multiple inner signal generators for generating a plurality of inner function signals, each inner function signal being generated according to a respective function of said plurality of orthogonal functions;
  a plurality of spreaders, each spreader being connected to a respective signal generator and receiving a respective data signal of the plurality of data signals for producing a respective spread spectrum data signal in response to the respective data signal and a respective function signal; wherein each spreader includes three exclusive-OR gates:
    a first exclusive-OR gate having two inputs and one output, a first input connected to a respective inner signal generator and the second input receiving a respective data signal of the plurality of data signals;
    a second exclusive-OR gate having two inputs and an output, a first input connected to the first outer signal generator, a second input connected to the output of the first exclusive-OR gate, and the output being connected to a signal combiner; and
    a third exclusive-OR gate having two inputs and an output, the first input connected to the second outer signal generator, the second input connected to the output of the first exclusive-OR gate, and the output connected to the signal combiner;
  said signal combiner being connected to the plurality of spreaders and combining a plurality of spread spectrum data signals into a combined spread spectrum data signal; and
  a transmitter connected to the signal combiner for amplifying and transmitting the combined spread spectrum data signal.

25. An apparatus for spread spectrum transmission of a plurality of data signals, comprising:
  a plurality of signal generators for providing a plurality of function signals, each function signal being provided according to a respective function of a plurality of orthogonal functions;
  a plurality of spreaders, each spreader connected to a respective signal generator and connected to receive a respective data signal of the plurality of data signals for spread spectrum generation of a respective spread spectrum data signal;
  a signal combiner connected to the plurality of spreaders for combining a plurality of spread spectrum data signals to generate a combined spread spectrum data signal including the plurality of spread spectrum data signals;
  a transmitter for amplifying and transmitting the combined spread spectrum data signal; and
  an outer code generator for generating an outer code signal, and wherein each spreader of the plurality of spreaders is further connected to the outer code generator for combining the outer code signal with a respective data signal and a respective function signal to produce a respective outer-coded spread spectrum data signal, and the signal combiner generates the combined spread spectrum data signal including a plurality of outer coded spread spectrum data signals.

26. A communication modulation system, comprising:

a pilot signal generator for generating a pilot signal according to a first orthogonal function selected from a set of orthogonal functions;

a communication signal generator for receiving an input data signal, generating an orthogonal function signal according to a second orthogonal function selected from said set of orthogonal functions, wherein said second orthogonal function is different from said first orthogonal function, combining said orthogonal function signal with said input data signal and providing a resultant spread spectrum data signal; and an outer code generator for receiving said pilot signal and said spread spectrum data signal, generating a pseudorandom noise (PN) signal of a predetermined PN code, and combining said PN signal with said pilot signal and said spread spectrum data signal to produce corresponding PN-spread pilot and spread spectrum data signals.

27. In a communication system in which a plurality of remote user stations communicate, via a radio link with a base station, with other user stations, said base station having a base station transceiver for communicating user station information signals to intended recipient remote user stations and for receiving remote user station communicated information signals for transfer to intended recipient user stations, said base station transceiver comprising:

a base station transmitter for receiving at least one user station information signal, spreading each received user station information signal according to a respective predetermined orthogonal function, and transmitting said spread user station information signals as a base station communication signal; and a base station receiver for receiving and extracting from each remote user station transmitted remote user station communication signal a corresponding remote user station information signal for transfer to intended recipient user stations, wherein each remote user station includes a remote user station transceiver for communicating remote user station information signals to said base station for transfer to an intended recipient user station and for receiving and extracting from said base station communication signal respective user station information signals intended for said recipient remote user station, said remote user station transceiver comprising:

a remote user station transmitter for receiving a remote user station information signal, converting said remote user station information signal into respective groups of orthogonal function signals, modulating and transmitting said orthogonal function signals as a remote user station communication signal; and a remote user station receiver for receiving and extracting from said base station communication signal said user station information signal intended for said remote user station.

* * * * *